United States Patent
Dai et al.

(10) Patent No.: US 9,806,338 B2
(45) Date of Patent: Oct. 31, 2017

(54) NANOPOROUS TITANIUM NIOBIUM OXIDE AND TITANIUM TANTALUM OXIDE COMPOSITIONS AND THEIR USE IN ANODES OF LITHIUM ION BATTERIES

(71) Applicant: UT-Battelle, LLC, Oak Ridge, TN (US)

(72) Inventors: Sheng Dai, Knoxville, TN (US);
Bingkun Guo, Knoxville, TN (US);
Xiao-Guang Sun, Knoxville, TN (US);
Zhenan Qiao, Oak Ridge, TN (US)

(73) Assignee: UT-BATTELE, LLC, Oak Ridge, TN (US)

( * ) Notice: Subject to any disclaimer, the term of this patent is extended or adjusted under 35 U.S.C. 154(b) by 135 days.

(21) Appl. No.: 13/974,544

(22) Filed: Aug. 23, 2013

(65) Prior Publication Data

US 2015/0056514 A1    Feb. 26, 2015

(51) Int. Cl.
| | |
|---|---|
| *H01M 4/485* | (2010.01) |
| *C01G 35/00* | (2006.01) |
| *C01G 33/00* | (2006.01) |
| *H01M 10/0525* | (2010.01) |

(52) U.S. Cl.
CPC ........... *H01M 4/485* (2013.01); *C01G 33/00* (2013.01); *C01G 35/006* (2013.01); *C01P 2002/72* (2013.01); *C01P 2004/03* (2013.01); *C01P 2004/04* (2013.01); *C01P 2006/12* (2013.01); *C01P 2006/16* (2013.01); *C01P 2006/40* (2013.01); *H01M 10/0525* (2013.01)

(58) Field of Classification Search
CPC .. H01M 4/48; H01M 2004/027; C01G 35/006
USPC ................... 429/231.3; 252/182.1
See application file for complete search history.

(56) References Cited

U.S. PATENT DOCUMENTS

| | | | |
|---|---|---|---|
| 7,205,073 | B2 | 4/2007 | Kim et al. |
| 7,425,388 | B2 | 9/2008 | Park et al. |
| 8,252,438 | B2 | 8/2012 | Han et al. |
| 8,496,855 | B2 | 7/2013 | Choi |
| 8,503,162 | B2 | 8/2013 | Seymour |
| 2007/0027015 | A1* | 2/2007 | Zhou .............. B82Y 30/00 501/17 |
| 2011/0052998 | A1 | 3/2011 | Liang et al. |
| 2012/0052401 | A1* | 3/2012 | Goodenough et al. ....... 429/341 |
| 2014/0295282 | A1* | 10/2014 | Harada ............... H01M 4/485 429/231.2 |

FOREIGN PATENT DOCUMENTS

JP    2001354419 A   * 12/2001

OTHER PUBLICATIONS

Wu, Xiaoyan, Investigation on Ti2Nb10O29 anode material for lithium-ion batteries, Electrochemistry Communications 25 (2012) 39-42.*
Lee, Byongjin, Three Dimensionally Ordered Mesoporous Niobium Oxide, J. Am. Chem. Soc. 2002, 124, 11256-11257.*
Cava, R.J., Dielectric Properties of TiO2-Nb2O5 Crystallographic Shear Structures, Journal of Materials Research, Jun. 1996, vol. 11, No. 6, pp. 1428-1432.*
Saritha, D., Materials Research Bulletin 48 (2013)2702-2706.*
Cava, R.J., J. Mater. Res., vol. 11, No. 6, Jun. 1996, pp. 1428-1432.*
STIC search by J. Wang.*
Translation of JP2001-354419.*
Scientific & Technical Information Center (STIC) Search by J. Wang on Mar. 11, 2017. File name 13974544-537506-EICSearch.pdf.*
Forghany S.K.E. et al., "Reduction of the Titanium Niobium Oxides. I. TiNb2O7 and Ti2Nb10O29", Journal of Solid State Chemistry 40:136-142 (1981).
Han J-T et al., "3-V Full Cell Performance of Anode Framework TiNb2O7/Spinel LiNi0.5Mn1.5O4", Chemistry of Materials 23:3404-3407 (2011).
Han J-T et al., "New Anode Framework for Rechargeable Lithium Batteries", Chemistry of Materials 23:2027-2029 (2011).
Tang K. et al., "Nano-Pearl-String TiNb2O7 as Anodes for Rechargeable Lithium Batteries", Advanced Energy Materials 3:49-53 (2013).
Yi T-F et al., "Recent Development and Application of Li4Ti5O12 as Anode Material of Lithium Ion Battery", Journal of Physics and Chemistry of Solids 71:1236-1242 (2010).

* cited by examiner

*Primary Examiner* — Patrick Ryan
*Assistant Examiner* — Victoria Lynch
(74) *Attorney, Agent, or Firm* — Scully Scott Murphy & Presser

(57) ABSTRACT

Nanoporous metal oxide framework compositions useful as anodic materials in a lithium ion battery, the composition comprising metal oxide nanocrystals interconnected in a nanoporous framework and having interconnected channels, wherein the metal in said metal oxide comprises titanium and at least one metal selected from niobium and tantalum, e.g., $TiNb_{2-x}Ta_xO_y$ (wherein x is a value from 0 to 2, and y is a value from 7 to 10) and $Ti_2Nb_{10-v}Ta_vO_w$ (wherein v is a value from 0 to 2, and w is a value from 27 to 29). A novel sol gel method is also described in which sol gel reactive precursors are combined with a templating agent under sol gel reaction conditions to produce a hybrid precursor, and the precursor calcined to form the anodic composition. The invention is also directed to lithium ion batteries in which the nanoporous framework material is incorporated in an anode of the battery.

16 Claims, 17 Drawing Sheets

(8A)

(8B)

NANOPOROUS TITANIUM NIOBIUM OXIDE AND TITANIUM TANTALUM OXIDE COMPOSITIONS AND THEIR USE IN ANODES OF LITHIUM ION BATTERIES

This invention was made with government support under Prime Contract No. DE-AC05-00OR22725 awarded by the U.S. Department of Energy. The government has certain rights in the invention.

FIELD OF THE INVENTION

The present invention relates generally to anode compositions for lithium ion batteries, and more particularly, to anode compositions having a titanium niobium oxide or titanium tantalum oxide composition.

BACKGROUND OF THE INVENTION

Lithium ion batteries (LIBs) are widely used in consumer electronics, such as laptop computers, camcorders, cameras, and cell phones, and are now being considered for applications in electric vehicles. With pressing worldwide environmental concerns, lithium ion batteries have been actively proposed for applications in electric vehicle (EV), hybrid electric vehicle (HEV) and plug-in hybrid-electric vehicles (PHEVs).

Graphite has been routinely used as a standard anode material in commercial LIBs because of its low cost, low lithium intercalation potential, and good cycling stability. However, LIBs using graphite as anode material cannot meet the stringent requirements for these applications because formation of a passivating solid-electrolyte interphase (SEI) layer on graphitic carbon depletes lithium irreversibly from the cathode on the initial charge, and the charging rate is limited because of plating of lithium on the SEI layer at the voltage required for a fast charge. Therefore, it would be advantageous to have a high capacity anode with its Fermi energy $E_F$ below the lowest unoccupied molecular orbital (LUMO) of the electrolytes so as to avoid formation of an anode SEI layer. The standard organic Li$^+$ liquid-carbonate electrolytes have a LUMO near 1.2 eV versus Li$^+$/Li, and an anode $E_F$ at 1.5 eV below that of lithium may compensate the loss of cell voltage by increasing the cathode capacity, providing safe high-rate performance, and by providing a longer cell cycle and shelf life. The leading anode candidate has been Li$_4$Ti$_5$O$_{12}$ (LTO) with an $E_F$ 1.55 eV below that of lithium as it exhibits a desirable cycle life and rate capability. However, the low storage capacity of LTO (~160 mAh g$^{-1}$) has limited its further application.

Recently, TiNb$_2$O$_7$ has been proposed as a high capacity anode material (J. T. Han, et al., *Chemistry of Materials*, 23, 2027 (2011); J. T. Han, et al., *Chemistry of Materials*, 23, 3404 (2011)). The theoretical capacity of TiNb$_2$O$_7$ is 387 mAh g$^{-1}$. Practically, a reversible capacity of around 280 mAh g$^{-1}$ has been obtained in a voltage range of 1.0-2.5 V, which is almost two times higher than that of LTO (~160 mAh g$^{-1}$) with similar average storage voltage. Unfortunately, an intrinsic low electronic and ionic conductivity have restricted its electrochemical performance. The electronic conductivity of materials can be effectively improved by doping or carbon coating. The characteristic diffusion time for lithium diffusion in electrode materials is $\tau \sim L^2/D$, where L is the diffusion length and D is the diffusion coefficient for Li$^+$ ion in the solid. Therefore, although reducing the particle size can dramatically reduce the Li$^+$ ion diffusion time and improve Li insertion/extraction kinetics because of the shorter Li$^+$ ion solid diffusion pathway, significant disadvantages remain, such as low volumetric energy density, low reversible capacities and low retention of same after numerous cycles, the weak adhesion of the nanosized materials to the current collector, lower than desirable lifetimes, and health hazards associated with use of these materials.

SUMMARY OF THE INVENTION

In one aspect, the invention is directed to a composition useful as an anodic material in a lithium ion battery. The composition contains metal oxide nanocrystals interconnected in a nanoporous framework and having interconnected channels, wherein the metal in the metal oxide includes titanium and at least one metal selected from niobium and tantalum. In a first set of particular embodiments, the metal oxide has the formula TiNb$_{2-x}$Ta$_x$O$_y$, wherein x is a value from 0 to 2, and y is typically a value from 7 to 10. In a second set of particular embodiments, the metal oxide has the formula Ti$_2$Nb$_{10-v}$Ta$_v$O$_w$, wherein v can be a value from 0 to 10, and more particularly, a value from 0 to 2, and w is typically value from 27 to 29.

In another aspect, the invention is directed to a method for preparing the above compositions useful as anodic materials in a lithium ion battery, the method including at least the following steps: (i) reacting a titanium sol gel reactive precursor and at least one of a niobium sol gel reactive precursor and tantalum sol gel reactive precursor in the presence of a surfactant template, all contained in a liquid solution, to form a hybrid precursor; and (ii) calcining the hybrid precursor at a temperature of at least 600° C. and up to 900° C. to form the composition. In some embodiments, a further step is included of drying the hybrid precursor at a temperature of up to 200° C. before calcining the hybrid precursor.

In yet another aspect, the invention is directed to lithium ion batteries in which any of the above anodic compositions is incorporated. The lithium ion battery includes at least: (i) an anode containing the above-described anodic material, (ii) a cathode suitable for a lithium ion battery, and (iii) a lithium-containing electrolyte medium in contact with the anode and cathode. The invention is also directed to the operation of a lithium ion battery in which any of the above anodic compositions is incorporated.

By virtue of the improved properties of the anodic compositions described herein, the resulting lithium ion battery containing the anodic composition described above exhibits several advantages over conventional lithium ion batteries of the art, including high reversible capacities, high retention of capacity after hundreds or thousands of cycles, and high coulombic efficiencies. The lithium ion battery may exhibit a similar average storage voltage as those of the art, but it can advantageously attain a much higher storage capacity (for example, at least 200, 250, or 300 mAh g$^{-1}$) as compared to the well-known Li$_4$Ti$_5$O$_{12}$ anode material, which generally exhibits a storage capacity of about 160 mAh g$^{-1}$. The interconnected nanoporous framework composed of nanocrystals in the anode composition described herein can provide a drastically enhanced rate (e.g., a capacity retention of about 70% at 20 C) and enhanced cycling performance (e.g., a very small capacity decay of 0.016% per cycle over 1000 cycles) with very high coulombic efficiency (around 100%). Thus, the instant disclosure represents a significant advance in the development of long-life stationary lithium-ion batteries with high energy density.

BRIEF DESCRIPTION OF THE DRAWINGS

FIGS. 1A, 1B: SEM images of nanoporous metal oxide framework materials TNO-700 (A) and TNO-850 (B); FIGS. 1C, 1D: TEM images of nanoporous metal oxide framework materials TNO-700 (C) and TNO-850 (D); FIG. 1E: HR-TEM image of TNO-700 (E); FIG. 1F: nitrogen adsorption isotherm and corresponding pore size distribution curve (inset) for TNO-700 (F).

FIG. 2A: Nitrogen adsorption isotherm and corresponding pore size distribution curve (inset) for the TNO-850 samples; FIG. 2B: nitrogen adsorption isotherm of the TNO-1000 sample.

FIG. 5A: Typical discharge/charge curves of the TNO-700 anode at a current rate of 0.1 C; FIG. 5B: discharge/charge curves of the TNO-700 anode at different current rates; FIG. 5C: capacity retention of the TNO-700 anode at various rates: discharge current rate fixed at 1 C; FIG. 5D: cyclic performance of the TNO-700 anode at a current rate of 5 C after aging at 0.1 C for 5 cycles; FIG. 5E: cyclic performance for the $LiNi_{0.5}Mn_{1.5}O_4$—$TiNb_2O_7$ (LNMO-TNO) full cell at 1 C with capacity limited by TNO cycled between 1.5 and 3.5 V (after aging at 0.1 C for 5 cycles) and typical discharge/charge curves for the LNMO-TNO full cell at 1 C (inset).

FIG. 7A: rate performance of the TNO-850 sample; FIG. 7B: capacity retention of the TNO-850 sample at various charge current rates, discharge current fixed at a current rate of 1 C; FIG. 7C: cyclic performance of the TNO-850 sample at a current rate of 5 C after aging at 0.1 C for 5 cycles.

FIG. 8A: Rate performance of the TNO-1000 sample; FIG. 8B: cyclic performance of the TNO-1000 sample at a current rate of 5 C after aging at 0.1 C for 5 cycles.

FIG. 9A: nitrogen adsorption isotherm for the TNO-600 sample; FIG. 9B: X-ray diffraction pattern of the TNO-600 sample; FIG. 9C: rate performance of the TNO-600 sample.

FIG. 10A: X-ray diffraction pattern of the TNTO-700 sample; FIG. 10B: nitrogen adsorption isotherm and corresponding pore size distribution curve (inset) for the TNTO-700 sample; FIG. 10C: rate performance of the TNTO-700 sample; FIG. 10D: cyclic performance of the TNTO-700 sample at a current rate of 5 C after aging at 0.1 C for 5 cycles.

FIG. 11A: Typical cyclic performance of the nanoporous $Ti_2Nb_{10}O_{29}$ at a current rate of 5 C; FIG. 11B: Typical rate performance of the nanoporous $Ti_2Nb_{10}O_{29}$.

FIG. 12A: Typical cyclic performance of nanoporous $Ti_2Nb_{10-v}Ta_vO_{29}$ (0<v<2) samples at a current rate of 5 C; FIG. 12B: Typical rate performance of nanoporous $Ti_2Nb_{10-v}Ta_vO_{29}$ (0<v<2) samples.

DETAILED DESCRIPTION OF THE INVENTION

Figures 1A, 1B, 1C, 1D, 1E:
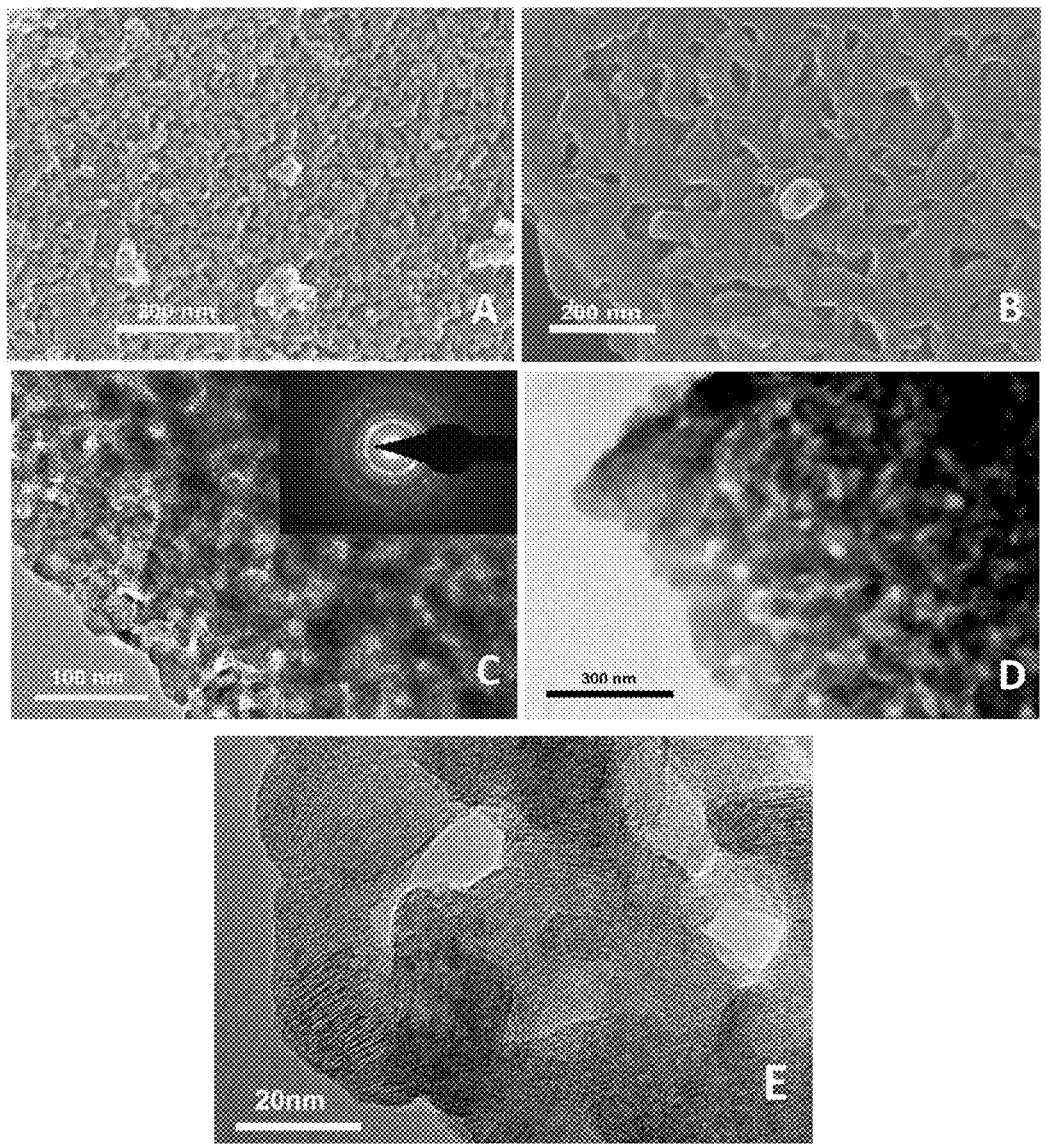
FIGS. 1A-1F. Porous structure characterizations.

As used herein, the term "about" generally indicates within ±0.5%, 1%, 2%, 5%, or up to ±10% of the indicated value. For example, a particle size of "about 10 nm" generally indicates in its broadest sense 10 nm±10%, which indicates 9.0-11.0 nm. The term "about" may alternatively indicate a variation or average in a physical characteristic of a group (e.g., a distribution of particle sizes or pore sizes).

In a first aspect, the invention is directed to a nanoporous composition useful as an anodic material in a lithium ion battery. The nanoporous composition contains metal oxide nanocrystals interconnected in a nanoporous framework and having interconnected channels, wherein the metal in the metal oxide includes titanium and at least one metal selected from niobium and tantalum. In a first embodiment, the metal oxide composition includes an oxide of titanium and niobium, and not tantalum. In a second embodiment, the metal oxide composition includes an oxide of titanium and tantalum, and not niobium. In a third embodiment, the metal oxide composition includes an oxide of titanium, niobium, and tantalum.

The term "nanocrystal", as used herein, indicates a crystalline composition having a nanosize dimension. By having a nanosize dimension, at least one or two of the spatial dimensions, and more typically, all three of the spatial dimensions of the nanocrystal have lengths of less than 1 micron, and more typically, up to or less than 500 nm, 400 nm, 300 nm, 200 nm, or 100 nm. In different embodiments, the nanocrystals have a size of precisely, about, at least, greater than, up to, or less than, for example, 1, 2, 3, 4, 5, 10, 15, 20, 25, 30, 35, 40, 45, 50, 60, 70, 80, 90, 100, 120, 150, 180, 200, 300, 400, or 500 nm, or a size or a plurality of sizes within a range bounded by any two of the foregoing values. In some embodiments, the nanocrystals have a substantially uniform primary or secondary size, e.g., a size that deviates by no more than 20%, 10%, or 5% from a mean or median value, wherein any of the exemplary particle sizes provided above can be taken as a mean or median value. In other embodiments, the nanocrystals are substantially dispersed in size, e.g., greater than 20%, or at least or up to 30%, 50%, 80%, 100%, 200%, 300%, 400%, or 500% deviation from a mean or median value. Moreover, any of the nanocrystal sizes provided above may refer to a primary particle size or to a secondary (i.e., agglomerated) particle size, wherein it is understood that a secondary nanocrystal necessarily includes primary nanocrystals of smaller size. The nanocrystals may also be considered to be nanocrystalline domains contained within the macroscopic nanoporous framework. In some embodiments, any range of particle sizes, as derived from particle sizes provided above, can be excluded. In particular embodiments, crystalline or non-crystalline particle sizes of or larger than 100 nm, 250 nm, 500 nm, or 1 micron are excluded.

The term "nanoporous framework" (i.e., "framework material"), as used herein, refers to an ordered structure created by the interconnection (i.e., physical bonding or fusion) of the nanocrystals or nanocrystalline domains. In the ordered structure, the nanocrystals arrange themselves in the form of an ordered framework in which spaces (i.e., pores) are included between nanocrystals or nanocrystalline domains. Thus, the inner walls of the pores are delineated by surfaces of nanocrystals not in contact with each other. At least some of the pores are nanopores, wherein the nanopores have diameters of a nanosize dimension. In different embodiments, the nanopores have a size of precisely, about, at least, greater than, up to, or less than, for example, 1, 2, 3, 4, 5, 10, 15, 20, 25, 30, 35, 40, 45, 50, 60, 70, 80, 90, 100, 120, 150, 180, 200, 300, 400, or 500 nm, or a size within a range bounded by any two of the foregoing values. The nanopores may also be substantially uniform or disperse in size, as provided above for particle size, wherein any of the foregoing exemplary nanopore sizes can be taken as a median or mean pore size. In some embodiments, the nanoporous composition includes a monomodal distribution of pore sizes, i.e., a single peak in a pore volume vs. pore size distribution plot, wherein the peak pore volume and bounds (i.e., minimum and maximum) of the pore peak can all be selected from exemplary pore sizes provided above. In other embodiments, the nanoporous composition includes a bimodal, trimodal, or higher modal distribution of pores, wherein the peak pore volume and bounds of each peak can be independently selected from exemplary pore sizes provided above. In some embodiments, any range of pore sizes, as derived from pore sizes provided above, can be excluded. In particular embodiments, pore sizes of or larger than 50 nm, 100 nm, 200 nm, 250 nm, 500 nm, or 1 micron are excluded. In other embodiments, pore sizes of or larger than 50 nm, 100 nm, 200 nm, 250 nm, 500 nm, or 1 micron, or pore sizes within a range bounded therein, may be included. In other embodiments, pore sizes up to or smaller than 1, 2, 3, 4, 5, 6, 7, 8, 9, or 10 nm are excluded.

The nanopores in the nanoporous framework are constructed as interconnected channels contained within and throughout the nanoporous framework. Thus, the nanopores are not solely shallow impressions on the surface of the framework material, but rather, deep channels interconnecting with each other throughout the body of the framework material. The nanoporous channels have any of the diameters (channel widths) provided above for the pores, and thus, can be monomodal, bimodal, or trimodal, as provided above. In some embodiments, channel widths of or larger than 50 nm, 100 nm, 200 nm, 250 nm, 500 nm, or 1 micron are excluded. In other embodiments, channel widths of or larger than 50 nm, 100 nm, 200 nm, 250 nm, 500 nm, or 1 micron, or channel widths within a range bounded therein, may be included. In other embodiments, channel widths up to or less than 1, 2, 3, 4, 5, 6, 7, 8, 9, or 10 nm are excluded.

In a first particular embodiment, the anodic composition has a metal oxide composition of the formula:

$$\text{TiNb}_{2-x}\text{Ta}_x\text{O}_y \qquad (1)$$

In Formula (1), x is a value from 0 to 2, and y is typically a value from 7 to 10. When x is 0, Formula (1) reduces to $\text{TiNb}_2\text{O}_y$, with some specific examples being $\text{TiNb}_2\text{O}_7$, $\text{TiNb}_2\text{O}_8$, and $\text{TiNb}_2\text{O}_9$. When x is 2, the Formula (1) reduces to $\text{TiTa}_2\text{O}_y$, with some specific examples being $\text{TiTa}_2\text{O}_7$, $\text{TiTa}_2\text{O}_8$, and $\text{TiTa}_2\text{O}_9$. When x is greater than 0 and less than 2 (e.g., a value of precisely or at least 0.1, 0.2, 0.5, 0.8, 1, 1.2, 1.5, 1.8, 1.9, or within a range bounded by any two of these values), Formula (1) includes both Nb and Ta in the Formula (1), with some more specific examples being $\text{TiNb}_{1.9}\text{Ta}_{0.1}\text{O}_y$, $\text{TiNb}_{1.8}\text{Ta}_{0.2}\text{O}_y$, $\text{TiNb}_{1.5}\text{Ta}_{0.5}\text{O}_y$, $\text{TiNb}_{1.2}\text{Ta}_{0.8}\text{O}_y$, $\text{TiNbTaO}_y$, $\text{TiNb}_{0.8}\text{Ta}_{1.2}\text{O}_y$, $\text{TiNb}_{0.5}\text{Ta}_{1.5}\text{O}_y$, $\text{TiNb}_{0.2}\text{Ta}_{1.8}\text{O}_y$, and $\text{TiNb}_{0.1}\text{Ta}_{1.9}\text{O}_y$, wherein y is typically 7, 8, or 9.

In a second particular embodiment, the anodic composition has a metal oxide composition of the formula:

$$\text{Ti}_2\text{Nb}_{10-v}\text{Ta}_v\text{O}_w \qquad (2)$$

In Formula (2), v can be a value from 0 to 10, although more typically 0 to 5 or 0 to 2, and w is typically a value from 27 to 29. When v is 0, Formula (2) reduces to $\text{Ti}_2\text{Nb}_{10}\text{O}_w$ with some specific examples being $\text{Ti}_2\text{Nb}_{10}\text{O}_{27}$, $\text{Ti}_2\text{Nb}_{10}\text{O}_{28}$ and $\text{Ti}_2\text{Nb}_{10}\text{O}_{29}$. When v is 10, the Formula (2) reduces to $\text{Ti}_2\text{Ta}_{10}\text{O}_w$, with some specific examples being $\text{Ti}_2\text{Ta}_{10}\text{O}_{27}$, $\text{Ti}_2\text{Ta}_{10}\text{O}_{28}$, and $\text{Ti}_2\text{Ta}_{10}\text{O}_{29}$. When v is greater than 0 and less than 10 (e.g., a value of precisely or at least 0.2, 0.5, 1, 1.5, 2, 3, 4, or 5, or within a range bounded by any two of these values), Formula (2) includes both Nb and Ta in the Formula (2), with some more specific examples being $\text{TiNb}_{9.8}\text{Ta}_{0.2}\text{O}_w$, $\text{TiNb}_{9.5}\text{Ta}_{0.5}\text{O}_w$, $\text{TiNb}_9\text{TaO}_w$, $\text{TiNb}_{8.5}\text{Ta}_{1.5}\text{O}_w$, $\text{TiNb}_8\text{Ta}_2\text{O}_w$, $\text{TiNb}_7\text{Ta}_3\text{O}_w$, $\text{TiNb}_5\text{Ta}_5\text{O}_w$, $\text{TiNb}_4\text{Ta}_6\text{O}_w$, $\text{TiNb}_3\text{Ta}_7\text{O}_w$, and $\text{TiNb}_2\text{Ta}_8\text{O}_w$, wherein w is typically 27, 28, or 29.

In another aspect, the invention is directed to a method of preparing the above-described nanoporous framework material useful as an anode for a lithium ion battery. In the method, a titanium sol gel reactive precursor and either or both of (i.e., at least one of) a niobium sol gel reactive precursor and a tantalum sol gel reactive precursor are first reacted under sol gel reaction (formation) conditions in the presence of a surfactant templating agent (i.e., "surfactant template"), all of which are contained in a liquid solution. Generally, all of the components are fully dissolved in the liquid solution. The term "sol gel reactive precursor" indicates a precursor compound or material sufficiently reactive to undergo hydrolysis under sol gel reaction conditions to form a metal oxide composition, as well known in the art. Typically, the sol gel reactive precursor is a metal alkoxide that can undergo hydrolysis in the presence of water and a hydrolyzing acid. In typical embodiments, the titanium, niobium, and tantalum sol gel reactive precursors can be represented by the formulas $\text{Ti(OR)}_4$, $\text{Nb(OR)}_5$, and $\text{Ta(OR)}_5$, respectively, wherein R is typically independently selected from hydrocarbon groups having 1, 2, 3, 4, 5, or 6 carbon atoms (e.g., methyl, ethyl, n-propyl, isopropyl, n-butyl, isobutyl, sec-butyl, t-butyl, n-pentyl, isopentyl, n-hexyl, isohexyl, and the like). Some examples of titanium sol gel reactive precursors include titanium (IV) methoxide, titanium (IV) ethoxide, titanium (IV) n-propoxide, and titanium (IV) n-butoxide. Some examples of niobium sol gel reactive precursors include niobium (V) methoxide, niobium (V) ethoxide, niobium (V) n-propoxide, and niobium (V) n-butoxide. Some examples of tantalum sol gel reactive precursors include tantalum (V) methoxide, tantalum (V) ethoxide, tantalum (V) n-propoxide, and tantalum (V) n-butoxide. The sol gel reactive precursors are generally fully dissolved in an alcoholic solvent or solvent system, which together can be considered the liquid solution.

The term "sol gel reaction conditions" are those conditions, as well known in the art, conducive to the hydrolysis of reactive precursors (e.g., metal alkoxides) to form a metal oxide sol gel composition. The sol gel reaction conditions generally include, at minimum, the presence of an acid and at least a trace amount of water. The acid can be any suitable hydrolyzing acid known in the art, including a mineral acid (e.g., HX, where X is a halide, or nitric or sulfur acid) and/or an organic acid, such as a carboxylic acid, such as acetic acid. After hydrolysis and sol gel reaction, an initial metal oxide hybrid precursor is formed in solution. In some embodiments, the hybrid precursor remains in solution after being formed, while in other embodiments, the hybrid precursor precipitates from solution, generally in the form of a gel. During the sol gel reaction, the reaction temperature may be conducted at room temperature (typically, 15, 20, 25, 30, or 35° C.), or at an elevated temperature (e.g., at least or above 40, 50, or 60° C.), or at a temperature below room temperature (e.g., up to or below 10, 5, or 0° C.).

To form the nanoporous metal oxide framework material from the hybrid precursor, the hybrid precursor is subjected to a calcination step (i.e., the hybrid precursor is calcined, otherwise understood to be "cured" or "annealed"), typically at a temperature of at least 600° C. and up to 900° C. for a suitable period of time to transform the hybrid precursor into the solid metal oxide framework material. In different embodiments, the calcination temperature is precisely, about, at least, above, up to (no more than), or less than, for example, 625° C., 650° C., 675° C., 700° C., 725° C., 750° C., 775° C., 800° C., 825° C., 850° C., or 875° C., or up to 900° C., or a temperature within a range bounded by any two of the foregoing temperatures. Generally, the calcination step is practiced by gradually increasing the temperature between any of the temperatures given above. In some embodiments, prior to the calcination process conducted at a temperature between 600° C. and up to 900° C., the hybrid precursor is gradually increased in temperature from a temperature below 600° C. (e.g., room temperature, typically 15, 20, 25, 30, or 35° C.) and any of the temperatures given above. In different embodiments, the temperature ramp rate between any of the calcination temperatures provided above, and/or between a lower temperature and a calcination temperature, is precisely, about, at least, above, up to, or less than, for example, 0.25° C./min, 0.5° C./min, 1° C./min, 1.5° C./min, 2° C./min, 3° C./min, 5° C./min, 7° C./min, 10° C./min, 12° C./min, 15° C./min, or 20° C./min, or a temperature ramp rate within a range bounded by any two of these values. The gradual temperature increase can also include one or more periods of residency at a particular temperature, and/or a change or multiple changes in the temperature ramp rate (including the use of a decreasing temperature within the range of calcination temperatures, if desired) during and/or prior to the calcination process. For purposes of obtaining the improved characteristics of the anodic framework material described herein, a calcination temperature above 900° C. is preferably not employed. In some embodiments, the calcination temperature does not employ a temperature over 775, 800, 825, 850, 875, or 900° C., or the calcination temperature is required to be less than any of the foregoing temperatures.

The time period for which the hybrid precursor is subjected to the calcination process (i.e., at a temperature of at least 600° C. and up to 900° C.) is any period of time for which a solid nanoporous metal oxide material is formed that has useful properties as an anodic component of a lithium ion battery. The time period can be, for example, 0.25, 0.5, 1, 1.5, 2, 3, 4, 5, 6, 12, 18, or 24 hours at any or between any of the calcination temperatures provided above, or alternatively, between a temperature less than 600° C. and any of the calcination temperatures provided above. The endpoint of the calcination process can be considered the point at which the temperature falls below 600° C.

After the calcination process, the resulting nanoporous metal oxide framework material is cooled, generally by gradual reduction or removal of the heat source with gradual heat dissipation to the surrounding environment. By appropriate adjustment of the heat source at the time of cooling, any suitable temperature decrease rate between a final peak calcination temperature and room temperature can be provided. Thus, the cooling period can be suitably adjusted and independently selected from, for example, any of the time periods provided above. The temperature decrease rate can be selected from, for example, any of the temperature ramp rates provided above, except that those ramp rates are then taken as declining rates.

Generally, the solvent is substantially or completely removed from the hybrid precursor before the hybrid precursor is subjected to the calcination step. Thus, in some embodiments, the hybrid precursor is subjected to a drying step prior to the calcination step. The drying step generally employs a temperature of less than 600° C., and more typically, a temperature of up to or less than 550, 500, 450, 400, 350, 300, 250, 200, 150, 100, 90, 80, 70, 60, 50, 40, or 30° C., or room temperature, or a temperature within a range bounded by any two of the foregoing values for any suitable period of time, such as any of the time periods provided above.

In particular embodiments, prior to subjecting the hybrid precursor to drying and calcination processes, the solution containing the hybrid precursor is applied to a solid surface, wherein the solid surface can be a component (e.g., current collector) of the anode. The coated surface is then subjected to drying and calcining processes to produce a film of the nanoporous metal oxide framework material on the solid component. In some embodiments, the solid film is left intact and either transferred to another solid surface more appropriate for the anode or left on an anode material after calcining. In other embodiments, the resulting solid film is removed and ground to a powder, and the powder admixed with other components (e.g., one or more conductive additives and/or a binder) before applying the resulting admixture to an anode component.

The surfactant templating component functions to organize the sol gel reactive precursor materials into an ordered (i.e., patterned) arrangement before the calcination step. During calcination, the block copolymer is typically completely volatized into gaseous byproducts, and thereby, generally does not contribute to the formation of the solid metal oxide framework material. However, the volatile gases serve the important role of creating the pores in the metal oxide framework material during the calcination step.

In particular embodiments, the templating component includes one or more block copolymers. As used herein, a "block copolymer" is a polymer containing two or more chemically distinguished polymeric blocks (i.e., sections or segments). The copolymer can be, for example, a diblock copolymer (e.g., A-B), triblock copolymer (e.g., A-B-C), tetrablock copolymer (e.g., A-B-C-D), or higher block copolymer, wherein A, B, C, and D represent chemically distinct polymeric segments. The block copolymer may be completely inorganic, but is more typically organic (i.e., carbon-based) so that the block copolymer is at least partially capable of volatilizing during the carbonization step. Preferably, the block copolymer contains at least two segments that possess a difference in hydrophilicity or hydrophobicity (i.e., is amphiphilic). Such block copolymers typically form periodic structures by virtue of selective interactions between like domains, i.e., between hydrophobic domains and between hydrophilic domains. The block copolymer is typically linear; however, branched (e.g., glycerol branching units) and grafted block copolymer variations are also contemplated herein. Typically, the block copolymer contains polar groups capable of interacting (e.g., by hydrogen or ionic bonding) with the sol gel reactive precursors. For this reason, the block copolymer is typically not a complete hydrocarbon such as styrene-butadiene. Some polar groups that can be included in the block copolymer to provide a favorable interactive bond with the sol gel reactive precursors include, for example, ether, hydroxy, amino, imino, and carbonyl groups.

Some general examples of suitable classes of block copolymers include those containing segments of polyacrylate or polymethacrylate (and esters thereof), polystyrene, polyethyleneoxide, polypropyleneoxide, polyethylene, polyacrylonitrile, polylactide, and polycaprolactone. Some specific examples of suitable block copolymers include polystyrene-b-poly(methylmethacrylate) (i.e., PS-PMMA), polystyrene-b-poly(acrylic acid) (i.e., PS-PAA), polystyrene-b-poly(4-vinylpyridine) (i.e., PS-P4VP), polystyrene-b-poly(2-vinylpyridine) (i.e., PS-P2VP), polyethylene-b-poly(4-vinylpyridine) (i.e., PE-P4VP), polystyrene-b-polyethyleneoxide (i.e., PS-PEO), polystyrene-b-poly(4-hydroxystyrene), polyethyleneoxide-b-polypropyleneoxide (i.e., PEO-PPO), polyethyleneoxide-b-poly(4-vinylpyridine) (i.e., PEO-P4VP), polyethylene-b-polyethyleneoxide (i.e., PE-PEO), polystyrene-b-poly(D,L-lactide), polystyrene-b-poly(methylmethacrylate)-b-polyethyleneoxide (i.e., PS-PMMA-PEO), polystyrene-b-polyacrylamide, polystyrene-b-polydimethylacrylamide (i.e., PS-PDMA), polystyrene-b-polyacrylonitrile (i.e., PS-PAN), and polyethyleneoxide-b-polyacrylonitrile (i.e., PEO-PAN).

In particular embodiments, the block copolymer is a triblock copolymer containing one or more poly-EO segments and one or more poly-PPO segments. More preferably, the triblock copolymer is a poloxamer (i.e. Pluronic® or Lutrol® polymer) according to the general formula $$(PEO)_a\text{-}(PPO)_b\text{-}(PEO)_c \qquad (3)$$

wherein PEO is a polyethylene oxide block and PPO is a polypropylene block (i.e., —CH$_2$CH(CH$_3$)O— or —CH(CH$_3$)CH$_2$O—), and the subscripts a, b, and c represent the number of monomer units of PEO and PPO, as indicated. Typically, a, b, and c are each at least 2, and more typically, at least 5, and typically up to a value of 100, 120, or 130. Subscripts a and c are typically of equal value in these types of polymers. In different embodiments, a, b, and c can independently have a value of about, or at least, or up to 10, 20, 30, 40, 50, 60, 70, 80, 90, 100, 120, 130, 140, 150, 160, 180, 200, 220, 240, or any particular range established by any two of these exemplary values.

In one embodiment of Formula (3), a and c values are each less than b, i.e., the hydrophilic PEO block is shorter on each end than the hydrophobic PPO block. For example, in different embodiments, a, b, and c can each independently have a value of 2, 5, 7, 10, 12, 15, 20, 25, 30, 35, 40, 45, 50, 55, 60, 65, 70, 75, 80, 85, 90, 95, 100, 110, 120, 130, 140, 150, or 160, or any range delimited by any two of these values, provided that a and c values are each less than b. Furthermore, in different embodiments, it can be preferred for the a and c values to be less than b by a certain number of units, e.g., by 2, 5, 7, 10, 12, 15, 20, 25, 30, 35, 40, 45, or 50 units, or any range therein. Alternatively, it can be preferred for the a and c values to be a certain fraction or percentage of b (or less than or greater than this fraction or percentage), e.g., about 10%, 20%, 25%, 30, 33%, 40%, 50%, 60%, 70%, 75%, 80%, 85%, 90%, or any range delimited by any two of these values.

In another embodiment of Formula (3), a and c values are each greater than b, i.e., the hydrophilic PEO block is longer on each end than the hydrophobic PPO block. For example, in different embodiments, a, b, and c can each independently have a value of 2, 5, 7, 10, 12, 15, 20, 25, 30, 35, 40, 45, 50, 55, 60, 65, 70, 75, 80, 85, 90, 95, 100, 110, 120, 130, 140, 150, or 160, or any range delimited by any two of these values, provided that a and c values are each greater than b. Furthermore, in different embodiments, it can be preferred for the a and c values to be greater than b by a certain number of units, e.g., by 2, 5, 7, 10, 12, 15, 20, 25, 30, 35, 40, 45, or 50 units, or any range therein. Alternatively, it can be preferred for the b value to be a certain fraction or percentage of a and c values (or less than or greater than this fraction or percentage), e.g., about 10%, 20%, 25%, 30, 33%, 40%, 50%, 60%, 70%, 75%, 80%, 85%, 90%, or any range delimited by any two of these values.

In different embodiments, the poloxamer can have a minimum average molecular weight of at least 500, 800, 1000, 1200, 1500, 2000, 2500, 3000, 3500, 4000, or 4500 g/mole, and a maximum average molecular weight of 5000, 5500, 6000, 6500, 7000, 7500, 8000, 8500, 9000, 9500, 10,000, 12,000, 15,000, or 20,000 g/mole, wherein a particular range can be established between any two of the foregoing values, and particularly, between any two of the minimum and maximum values. The viscosity of the polymers is generally at least 200, 250, 300, 350, 400, 450, 500, 550, 600, or 650 centipoise (cps), and generally up to 700, 800, 900, 1000, 1500, 2000, 2500, 3000, 3500, 4000, 4500, 5000, 5500, 6000, 6500, 7000, or 7500 cps, or any particular range established between any two of the foregoing values.

The following table lists several exemplary poloxamer polymers applicable to the present invention.

TABLE 1

Some exemplary poloxamer polymers

| Generic Name | Pluronic ® Name | Approximate value of a | Approximate value of b | Approximate value of c |
|---|---|---|---|---|
| Poloxamer 101 | Pluronic L-31 | 2 | 16 | 2 |
| Poloxamer 105 | Pluronic L-35 | 11 | 16 | 11 |
| Poloxamer 108 | Pluronic F-38 | 46 | 16 | 46 |
| Poloxamer 122 | — | 5 | 21 | 5 |
| Poloxamer 123 | Pluronic L-43 | 7 | 21 | 7 |
| Poloxamer 124 | Pluronic L-44 | 11 | 21 | 11 |
| Poloxamer 181 | Pluronic L-61 | 3 | 30 | 3 |
| Poloxamer 182 | Pluronic L-62 | 8 | 30 | 8 |
| Poloxamer 183 | — | 10 | 30 | 10 |
| Poloxamer 184 | Pluronic L-64 | 13 | 30 | 13 |
| Poloxamer 185 | Pluronic P-65 | 19 | 30 | 19 |
| Poloxamer 188 | Pluronic F-68 | 75 | 30 | 75 |
| Poloxamer 212 | — | 8 | 35 | 8 |
| Poloxamer 215 | — | 24 | 35 | 24 |
| Poloxamer 217 | Pluronic F-77 | 52 | 35 | 52 |
| Poloxamer 231 | Pluronic L-81 | 6 | 39 | 6 |
| Poloxamer 234 | Pluronic P-84 | 22 | 39 | 22 |
| Poloxamer 235 | Pluronic P-85 | 27 | 39 | 27 |
| Poloxamer 237 | Pluronic F-87 | 62 | 39 | 62 |
| Poloxamer 238 | Pluronic F-88 | 97 | 39 | 97 |
| Poloxamer 282 | Pluronic L-92 | 10 | 47 | 10 |
| Poloxamer 284 | — | 21 | 47 | 21 |
| Poloxamer 288 | Pluronic F-98 | 122 | 47 | 122 |
| Poloxamer 331 | Pluronic L-101 | 7 | 54 | 7 |
| Poloxamer 333 | Pluronic P-103 | 20 | 54 | 20 |
| Poloxamer 334 | Pluronic P-104 | 31 | 54 | 31 |
| Poloxamer 335 | Pluronic P-105 | 38 | 54 | 38 |
| Poloxamer 338 | Pluronic F-108 | 128 | 54 | 128 |
| Poloxamer 401 | Pluronic L-121 | 6 | 67 | 6 |
| Poloxamer 403 | Pluronic P-123 | 21 | 67 | 21 |
| Poloxamer 407 | Pluronic F-127 | 98 | 67 | 98 |

As known in the art, the names of the poloxamers and Pluronics (as given above) contain numbers which provide information on the chemical composition. For example, the generic poloxamer name contains three digits, wherein the first two digits×100 indicates the approximate molecular weight of the PPO portion and the last digit×10 indicates the weight percent of the PEO portion. Accordingly, poloxamer 338 possesses a PPO portion of about 3300 g/mole molecular weight, and 80 wt % PEO. In the Pluronic name, the letter indicates the physical form of the product, i.e., L=liquid, P=paste, and F=solid, i.e., flake. The first digit, or two digits for a three-digit number, multiplied by 300, indicates the approximate molecular weight of the PPO portion, while the last digit×10 indicates the weight percent of the PEO portion. For example, Pluronic® F-108 (which corresponds to poloxamer 338) indicates a solid form composed of about 3,000 g/mol of the PPO portion and 80 wt % PEO.

Numerous other types of copolymers containing PEO and PPO blocks are possible, all of which are applicable herein. For example, the block copolymer can also be a reverse poloxamer of general formula:

$$(PPO)_a\text{-}(PEO)_b\text{-}(PPO)_c \quad (4)$$

wherein all of the details considered above with respect to the regular poloxamers (e.g., description of a, b, and c subscripts, and all of the other exemplary structural possibilities) are applicable by reference herein to the reverse poloxamers.

In another variation, the block copolymer contains a linking diamine group (e.g., ethylenediamine, i.e., EDA) or triamine group (e.g., melamine). Some examples of such copolymers include the Tetronics® (e.g., PEO-PPO-EDA-PPO-PEO) and reverse Tetronics® (e.g., PPO-PEO-EDA-PEO-PPO).

In another aspect, the invention is directed to a lithium ion battery containing a nanoporous metal oxide framework material, described above, in the anode of the battery. The lithium ion battery generally contains the components typically found in a lithium ion battery, including positive (cathodic) and negative (anodic) electrodes, current collecting plates, and a battery shell, such as described in, for example, U.S. Pat. Nos. 8,496,855, 8,252,438, 7,205,073, and 7,425,388, the contents of which are incorporated herein by reference in their entirety. The construction and assembly of lithium ion batteries is well known in the art.

The positive electrode is typically a lithium-containing or lithium-intercalated material, such as, for example, lithium foil or a lithium metal oxide, wherein the metal is typically a transition metal, such as Co, Fe, Ni, or Mn, or combination thereof. Some examples of positive electrode materials include $LiCoO_2$, $LiNiCoO_2$, $LiMnO_2$, and $LiFePO_4$, as well as spinel lithium manganese oxide compositions according to the formula $Li_xMn_{2-y-z}Ni_yM_zO_{4-n}X_n$, (e.g., $0.025 \le x \le 1.1$, $0.3 \le y \le 0.5$, $0 \le z \le 1.5$, $0 \le n \le 1$, M is a main group or transition metal, and X is a halide atom, such as F, Cl, Br, or I) in which a portion of the manganese is substituted with another metal, e.g., $LiNi_{0.5}Mn_{1.5}O_4$, $Li_{1.1}Ni_{0.45}Mn_{1.4}W_{0.05}O_4$, $Li_{1.05}Ni_{0.5}Mn_{1.5}O_{3.9}F_{0.1}$, and $Li_{1.1}Ni_{0.45}Mn_{1.4}Nb_{0.05}O_{3.95}F_{0.05}$.

To improve conductivity at the positive electrode, a conductive carbon material (e.g., carbon black, carbon fiber, graphite, carbon nanotubes, buckminsterfullerenes, or carbon foam) is typically admixed with the positive and/or negative electrode material. Moreover, the positive and negative electrode compositions are typically admixed with a binder or adhesive (e.g., PVdF, PTFE, and co-polymers thereof) in order to be properly molded as electrodes. As also known in the art, the positive and negative electrodes are typically affixed onto current collecting substrates, such as Cu or Al foil.

The lithium ion battery may also include a solid porous membrane positioned between the negative and positive electrodes. The solid porous membrane can be composed of, for example, a plastic or polymeric material (e.g., polyethylene, polypropylene, or copolymer thereof) or an inorganic material, such as a transition metal oxide (e.g., titania, zirconia, yttria, hafnia, or niobia) or main group metal oxide, such as silicon oxide, which can be in the form of glass fiber.

As well known in the art, the lithium ion battery typically also includes a lithium-containing electrolyte. The lithium-containing electrolyte typically includes at least one lithium electrolyte salt dissolved in a polar aprotic solvent (which may be composed of one or more polar aprotic solvents). The polar aprotic solvent can be, for example, ionic (e.g., an ionic liquid) or non-ionic. The one or more polar aprotic solvents are preferably non-reactive with the components of the lithium ion battery, including the anode and the cathode, and furthermore, do not have a deleterious effect on the performance characteristics of the battery. The polar aprotic solvent, if present, can be any such solvent known to be useful in a lithium ion battery. The polar aprotic solvent typically has a melting point of up to or less than 100, 90, 80, 70, 60, or 50° C., and more typically, below room temperature, i.e., below about 25° C., and more typically, up to or less than 20, 15, 10, 5, or 0° C. The non-ionic solvent can be, for example, a carbonate, sulfone, siloxane, silane, ether, ester, nitrile, sulfoxide, or amide solvent, or a mixture thereof.

Some examples of carbonate solvents include propylene carbonate (PC), ethylene carbonate (EC), butylene carbonate (BC), chloroethylene carbonate, fluorocarbonate solvents (e.g., fluoroethylene carbonate and trifluoromethyl propylene carbonate), as well as the dialkylcarbonate solvents, such as dimethyl carbonate (DMC), diethyl carbonate (DEC), dipropyl carbonate (DPC), ethyl methyl carbonate (EMC), methyl propyl carbonate (MPC), and ethyl propyl carbonate (EPC).

Some examples of sulfone solvents include methyl sulfone, ethyl methyl sulfone, methyl phenyl sulfone, methyl isopropyl sulfone (MiPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl (methyl)sulfone and 2-methoxyethoxyethyl(ethyl)sulfone).

The polar aprotic solvent can be silicon-containing, e.g., a siloxane or silane. Some examples of siloxane solvents include hexamethyldisiloxane (HMDS), 1,3-divinyltetramethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane.

Other types of polar aprotic solvents include ether, ester, nitrile, sulfoxide, and amide solvents. Some examples of ether solvents include diethyl ether, 1,2-dimethoxyethane, 1,2-diethoxyethane, 1,3-dioxolane, tetrahydrofuran, 2-methyltetrahydrofuran, tetrahydropyran, diglyme, triglyme, 1,3-dioxolane, and the fluorinated ethers (e.g., mono-, di-, tri-, tetra-, penta-, hexa- and per-fluoro derivatives of any of the foregoing ethers). Some examples of ester solvents include 1,4-butyrolactone, ethylacetate, methylpropionate, ethylpropionate, propylpropionate, methylbutyrate, ethylbutyrate, the formates (e.g., methyl formate, ethyl formate, or propyl formate), and the fluorinated esters (e.g., mono-, di-, tri-, tetra-, penta-, hexa- and per-fluoro derivatives of any of the foregoing esters). Some examples of nitrile solvents include acetonitrile, propionitrile, and butyronitrile. Some examples of sulfoxide solvents include dimethyl sulfoxide, ethyl methyl sulfoxide, diethyl sulfoxide, methyl propyl sulfoxide, and ethyl propyl sulfoxide. Some examples of amide solvents include formamide, N,N-dimethylformamide, N,N-diethylformamide, acetamide, dimethylacetamide, diethylacetamide, gamma-butyrolactam, and N-methylpyrrolidone. The polar aprotic solvent may also be, for example, an organochloride (e.g., methylene chloride, chloroform, 1,1,-trichloroethane), ketone (e.g., acetone, 2-butanone), organoether (e.g., diethyl ether, tetrahydrofuran, and dioxane), hexamethylphosphoramide (HMPA), N-methylpyrrolidinone (NMP), 1,3-dimethyl-3,4,5,6-tetrahydro-2(1H)-pyrimidinone (DMPU), and propylene glycol monomethyl ether acetate (PGMEA).

A solvent additive may also be included in the electrolyte. If present, the solvent additive should typically facilitate formation of a solid electrolyte interphase (SEI) on the anode. The non-ionic solvent additive can be, for example, any of the non-ionic solvent additives described above, but is more typically any such solvent that possesses one or more unsaturated groups containing a carbon-carbon double bond and/or one or more halogen atoms. Some particular examples of solvent additives include vinylene carbonate (VC), vinyl ethylene carbonate, allyl ethyl carbonate, vinyl acetate, divinyl adipate, acrylic acid nitrile, 2-vinyl pyridine, maleic anhydride, methyl cinnamate, ethylene carbonate, halogenated ethylene carbonate, bromobutyrolactone, methyl chloroformate, and sulfite additives, such as ethylene sulfite (ES), propylene sulfite (PS), and vinyl ethylene sulfite (VES). In other embodiments, the additive is selected from 1,3-propanesultone, ethylene sulfite, propylene sulfite, fluoroethylene sulfite (FEC), α-bromo-γ-butyrolactone, methyl chloroformate, t-butylene carbonate, 12-crown-4 ether, carbon dioxide ($CO_2$), sulfur dioxide ($SO_2$), sulfur trioxide ($SO_3$), acid anhydrides, reaction products of carbon disulfide and lithium, and polysulfide. The additive is generally included in an amount that effectively impacts SEI formation without reducing the electrochemical window by an appreciable extent, i.e., below about 5.0V. For example, the additive may be included in an amount of precisely, about, at least, above, up to, or less than 0.1, 0.5, 1, 2, 3, 4, 5, 10, 15, 20, 25, 30, 35, 40, 45, 50, 60, 70, or 80 wt % by weight of the electrolyte, or an amount within a range bounded by any two of the foregoing exemplary values, wherein the lithium salt is not considered in the wt %. In some embodiments, one or more of the foregoing additive solvents may function predominantly or completely as the polar aprotic solvent (e.g., 90, 95, or 100 wt % of the electrolyte).

In some embodiments, the polar aprotic solvent and/or solvent additive is partially or completely replaced with one or more ionic liquid compounds. The ionic liquid can be denoted by the formula $Y^+X^-$, wherein $Y^+$ is a cationic component of the ionic liquid and $X^-$ is an anionic component of the ionic liquid. The formula $(Y^+)(X^-)$ is meant to encompass a cationic component $(Y^+)$ having any valency of positive charge, and an anionic component $(X^-)$ having any valency of negative charge, provided that the charge contributions from the cationic portion and anionic portion are counterbalanced in order for charge neutrality to be preserved in the ionic liquid molecule. More specifically, the formula $(Y^+)(X^-)$ is meant to encompass the more generic formula $(Y^{+a})_y(X^{-b})_x$, wherein the variables a and b are, independently, non-zero integers, and the subscript variables x and y are, independently, non-zero integers, such that a.y=b.x (wherein the period placed between variables indicates multiplication of the variables).

The ionic liquid compound is typically a liquid at room temperature (e.g., 15, 18, 20, 22, 25, or 30° C.) or lower. However, in some embodiments, the ionic liquid may become a liquid at a higher temperature than 30° C. if it is used at an elevated temperature that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

In various embodiments, the cationic portion $(Y^+)$ of the ionic liquid $Y^+X^-$ is selected from imidazolium, pyridinium, pyrazinium, pyrrolidinium, piperidinium, piperazinium, morpholinium, pyrrolium, pyrazolium, pyrimidinium, triazolium, oxazolium, thiazolium, and triazinium rings, as well as quaternary ammonium, phosphonium, sulfonium, and cyclic and acyclic guanidinium rings. The counteranion $(X^-)$ of the ionic liquid can be any of the counteranions well known in the art. In some embodiments, the counteranion is inorganic by not including any C—C, C—H, or C—F bonds, such as a halide (e.g., $F^-$, $Cl^-$, $Br^-$, or $I^-$), $PCl_6^-$, $PF_6^-$, perchlorate, chlorate, chlorite, cyanate, isocyanate, thiocyanate, isothiocyanate, perbromate, bromate, bromite, periodiate, iodate, dicyanamide (i.e., $N(CN)_2^-$), tricyanamide (i.e., $N(CN)_3^-$), nitrate, nitrite, carbonate, bicarbonate, sulfate, sulfite, hydrogensulfate, hydrogensulfite, phosphate, hydrogenphosphate ($HPO_4^{2-}$), and dihydrogenphosphate ($H_2PO_4^-$). In other embodiments, the counteranion is carbon-containing (i.e., organic) by containing at least one C—C, C—H, or C—F bond, such as the carboxylates (e.g., formate, acetate, propionate, butyrate, valerate, lactate, pyruvate, oxalate, malonate, glutarate, adipate, decanoate, salicylate, ibuprofenate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, docusate, and the like), the alkoxides (e.g., methoxide, ethoxide, isopropoxide, phenoxide, and glycolate), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In some embodiments, any one or more classes or specific types of polar aprotic solvents, solvent additives, and/or ionic liquids are excluded from the electrolyte. In other embodiments, a combination of two or more polar aprotic solvents or a combination of two or more solvent additives and/or ionic liquids are included in the electrolyte.

The lithium ion electrolyte (i.e., lithium salt) can be any of the lithium salts (lithium ion electrolytes) known in the art for use in lithium ion batteries. Any of the counteranions $X^-$, described above, can be included as a counteranion in the lithium salt.

In one embodiment, the lithium ion electrolyte is non-carbon-containing (i.e., inorganic). For example, the lithium ion electrolyte can be a lithium ion salt of such counteranions as the halides (e.g., $F^-$, $Cl^-$, $Br^-$, or $I^-$), hexachlorophosphate ($PCl_6^-$), hexafluorophosphate ($PF_6^-$), perchlorate, chlorate, chlorite, perbromate, bromate, bromite, periodiate, iodate, aluminum fluorides (e.g., $AlF_4^-$), aluminum chlorides (e.g., $Al_2Cl_7^-$ and $AlCl_4^-$), aluminum bromides (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, the borates (e.g., borate, diborate, triborate, tetraborate), tetrafluoroborate, anionic borane clusters (e.g., $B_{10}H_{10}^{2-}$ and $B_{12}H_{12}^{2-}$), perrhenate, permanganate, ruthenate, perruthenate, and the polyoxometallates.

In another embodiment, the lithium ion electrolyte is carbon-containing (i.e., organic). The organic counteranion may, in one embodiment, lack fluorine atoms. For example, the lithium ion electrolyte can be a lithium ion salt of such counteranions as carbonate, the carboxylates (e.g., formate, acetate, propionate, butyrate, valerate, lactate, pyruvate, oxalate, malonate, glutarate, adipate, decanoate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), the alkoxides (e.g., methoxide, ethoxide, isopropoxide, and phenoxide), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), anionic carborane clusters, the alkylsulfates (e.g., diethylsulfate), alkylphosphates (e.g., ethylphosphate or diethylphosphate), dicyanamide (i.e., $N(CN)_2^-$), and the phosphinates (e.g., bis-(2,4,4-trimethylpentyl)phosphinate). The organic counteranion may, in another embodiment, include fluorine atoms. For example, the lithium ion electrolyte can be a lithium ion salt of such counteranions as the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In some embodiments, any one or more classes or specific types of lithium salts are excluded from the electrolyte. In other embodiments, a combination of two or more lithium salts are included in the electrolyte. Other cationic species, such as sodium ions or an ammonium species, may or may not also be included.

The lithium ion electrolyte is incorporated in the electrolyte medium preferably in an amount that imparts a suitable concentration of lithium ions and suitable level of conductivity to the electrolyte medium. The conductivity of the electrolyte medium can be, for example, at least 0.01 mS/cm (0.001 S/m) at an operating temperature of interest, and particularly at a temperature within 20-60° C. In different embodiments, the lithium ion electrolyte is present in the electrolyte in a concentration of precisely, about, at least, above, up to, or less than, for example, 0.1, 0.5, 1.0, 1.2, 1.5, 1.8, 2, 2.5, or 3 M, where "M" indicates a molarity concentration.

In yet another aspect, the invention is directed to a method of operating a lithium ion battery, described above, that contains the nanoporous metal oxide framework material in an anode of the battery. The operation of lithium ion batteries is well known in the art. The lithium ion battery described herein can advantageously exhibit a reversible storage capacity of at least, for example, 150, 160, 170, 180, 190, 200, 210, 220, 230, 240, 250 260, 270, 280, 290, or 300 mAh/g. The battery described herein can also advantageously exhibit a coulombic efficiency of at least 80%, 85%, 90%, 95%, 96%, 97%, 98%, 99%, or 100% maintained over at least 50, 100, 150, 200, 250, 300, 400, 500, 600, 700, 800, 900, 1000, 1200, 1500, 1800, or 2000 cycles. Even more, the battery described herein can exhibit a significantly enhanced rate (e.g., a capacity retention of at least 70%, 75%, 80%, or 85% at 20 C over) and cycling performance (e.g., a very small capacity decay of 0.016% per cycle or 84% capacity retention over 1000 cycles) along with high coulombic efficiency.

Examples have been set forth below for the purpose of illustration and to describe certain specific embodiments of the invention. However, the scope of this invention is not to be in any way limited by the examples set forth herein.

EXAMPLES

Preparation and Analysis of Nanoporous Titanium Niobium Oxide Framework Materials Synthesis of Nanoporous $TiNb_2O_7$ Framework Material Nanoporous $TiNb_2O_7$ samples were synthesized using a sol-gel method. In a typical synthesis, 4.8 g of the surfactant templating agent F127 was dissolved in a mixture solution of 90 mL ethanol, 6 mL HCl, and 7 mL of HOAc. After stirring for 1 hour, 20 mmol of niobium ethoxide (Nb$(OC_2H_5)_5$) and 10 mmol tetrabutyl orthotitanate (Ti$(OC_4H_9)_4$) were added into the solution. After stifling vigorously for 1 hour, the mixture was transferred into a Petri dish and dried at 60° C. for 12 hours. As-synthesized hybrid materials were calcined at the following different temperatures: 600° C., 700° C., 850° C., and 1000° C. in air for 3 hours (ramp rate of 2° C./min) to obtain $TiNb_2O_7$ samples designated as TNO-600, TNO-700, TNO-850 and TNO-1000, respectively. Nanoporous $TiNb_{1.8}Ta_{0.2}O_7$ (TNTO) was prepared by the same method as nanoporous $TiNb_2O_7$ samples, except that 10% tantalum ethoxide (Ta$(OC_2H_5)_5$) was included.

Synthesis of Nanoporous $Ti_2Nb_{10}O_{29}$ Framework Material

Nanoporous $Ti_2Nb_{10}O_{29}$ samples were synthesized using a sol-gel method. In a typical synthesis, 4.8 g of F127 was dissolved in a mixture solution of 90 mL ethanol, 6 mL HCl, and 7 ml HOAc. After stirring for 1 hour, 25 mmol of niobium ethoxide (Nb$(OC_2H_5)_5$) and 5 mmol tetrabutyl orthotitanate (Ti$(OC_4H_9)_4$) were added into the solution. After stifling vigorously for 1 hour, the mixture was transferred into a Petri dish and dried at 60° C. for 12 hours. As-synthesized hybrid materials were calcined at the following different temperatures: 700° C., 850° C., and 1000° C. in air for 3 hours (ramp rate of 2° C./min) to obtain $Ti_2Nb$ 10029 samples designated as $T_2$NO-700, $T_2$NO-850 and $T_2$NO-1000, respectively.

Synthesis of Nanoporous $Ti_2Nb_{10-x}Ta_xO_{29}$ (0<x<2) Framework Material

Nanoporous $Ti_2Nb_{10-x}Ta_xO_{29}$ (0<x<2) samples were synthesized using a sol-gel method. In a typical synthesis, 4.8 g of F127 was dissolved in a mixture solution of 90 mL ethanol, 6 mL HCl, and 7 ml HOAc. After stifling for 1 hour, 2.5*(10-x) mmol of niobium ethoxide (Nb$(OC_2H_5)_5$), 2.5x mmol tantalum ethoxide (Ta$(OC_2H_5)_5$), and 5 mmol tetrabutyl orthotitanate (Ti$(OC_4H_9)_4$) were added into the solution. After stirring vigorously for 1 hour, the mixture was transferred into a Petri dish and dried at 60° C. for 12 hours. As-synthesized hybrid materials were calcined at the following different temperatures: 700° C., 850° C., and 1000° C. in air for 3 hours (ramp rate of 2° C./min) to obtain $Ti_2Nb_{10-x}Ta_xO_{29}$ samples designated as $T_2NT_xO$-700, $T_2NT_xO$-850 and $T_2NT_xO$-1000, respectively.

Microscopic Characterization of the Nanoporous Framework Materials

Scanning electron microscope (SEM) images were recorded on a Hitachi® HD-2000 SEM microscope operating at 200 kV. Transmission electron microscope (TEM) images were recorded on a FEI Titan® 60/300 (S) TEM microscope equipped with a Gatan GIF Quantum® Image Filter. FIGS. 1A and 1B show the SEM images of TiNb$_2$O$_7$ samples prepared at 700° C. (TNO-700) and 850° C. (TNO-850), respectively. Clearly, both of them are highly porous in nature. The TNO-700 sample displays smaller pores with primary particles around 20-30 nm. It seems that the preparation at the higher temperature of 850° C. results in an increase in particle size (50-100 nm) and pore size (40-60 nm). As shown in the TEM images of FIGS. 1C and 1D, the pores in TNO-700 and TNO-850 are distributed throughout the bulk particles rather than only on the surface. FIG. 1E shows the high-resolution TEM (HRTEM) image of TNO-700. The sample is fully crystalline and composed of nanocrystals interconnected into a porous scaffold. The size of the crystalline domains is about 20-30 nm.

Nitrogen Adsorption Characterization of the Nanoporous Framework Materials

Nitrogen adsorption isotherms were measured at −196° C. using a TriStar® 3000 volumetric adsorption analyzer. Before the adsorption measurements, the as-prepared samples were degas sed in flowing nitrogen for 2 hours at 200° C. The specific surface area of the sample was calculated using the Brunauer-Emmett-Teller (BET) method within the relative pressure range of 0.05 to 0.20. Pore size distribution plots were derived from the adsorption branch of the isotherms based on the BJH model.

Figure 1F:
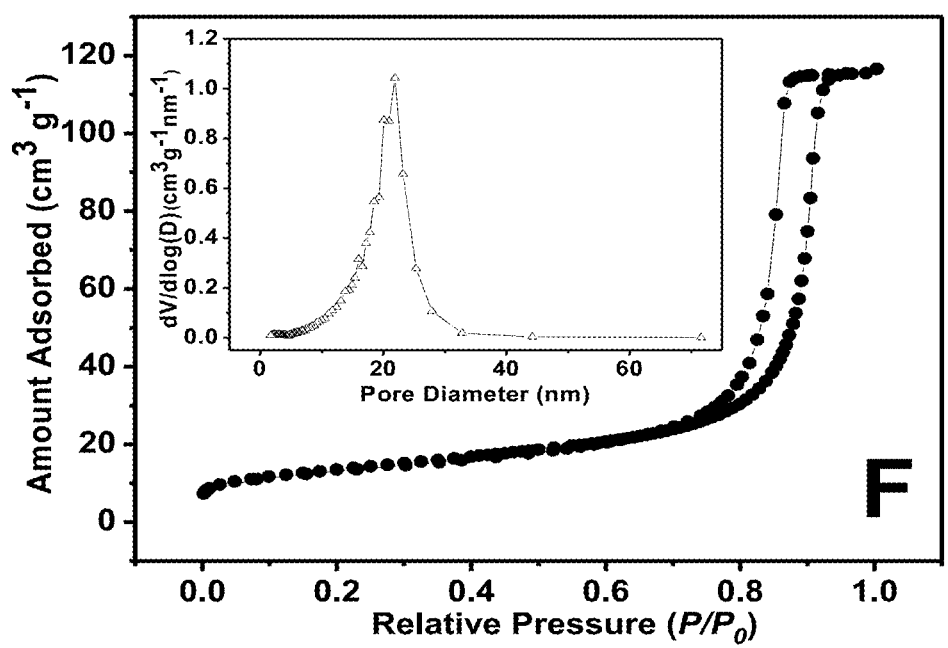
Figure 2A:
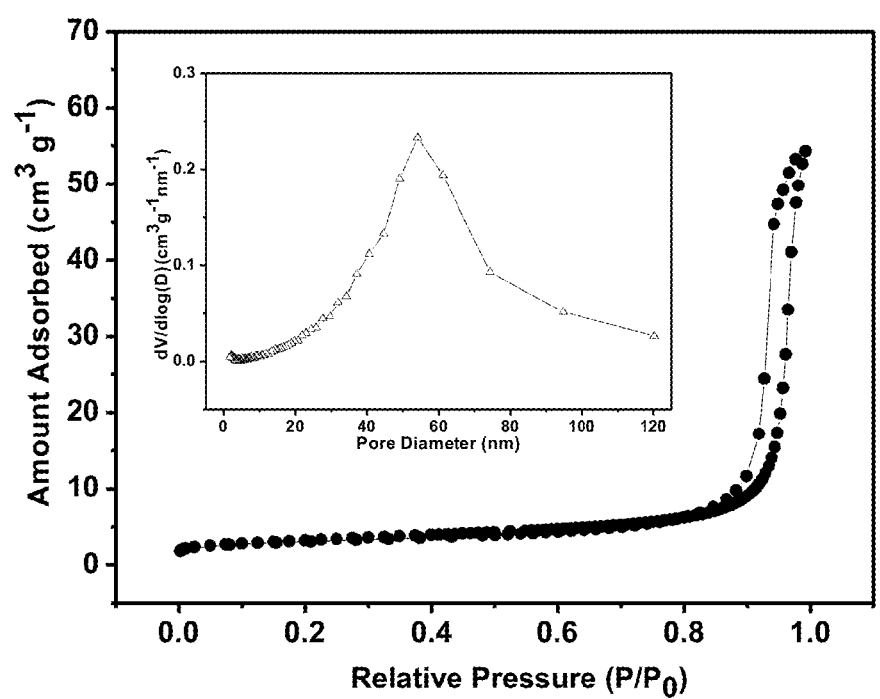
FIGS. 2A, 2B.
Figure 2B:
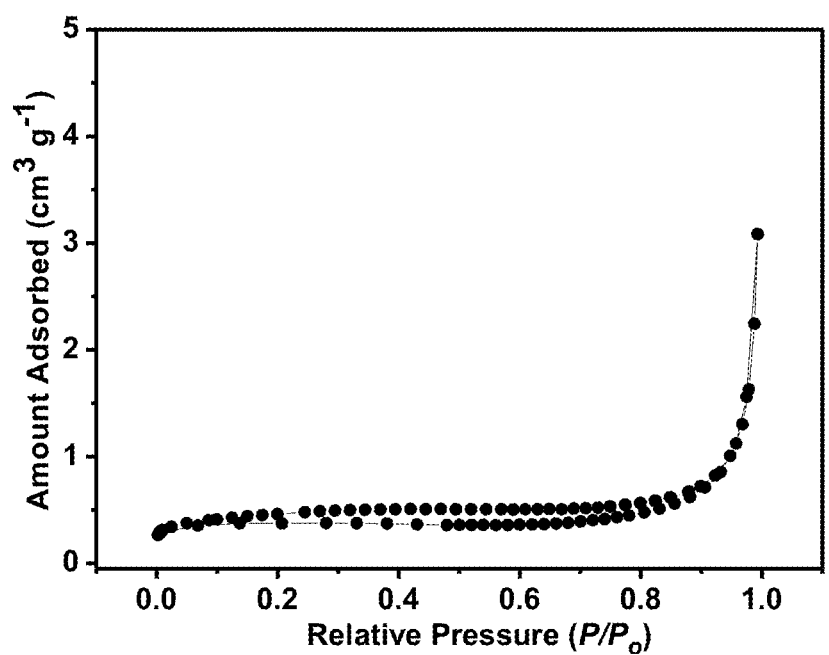

The nitrogen adsorption study shows that TNO-700 (FIG. 1F) and TNO-850 (FIG. 2A) have surface areas of 45 m$^2$ g$^{-1}$ and 11 m$^2$ g$^{-1}$, respectively. The average pore size estimated with the BJH method for TNO-700 and TNO-850 is 20 nm and 55 nm respectively, which is in good agreement with analysis from TEM and SEM. As expected, nanoporous TiNb$_2$O$_7$ collapses to bulk particles and shows non-porous characteristics after heating to 1000° C. (FIG. 2B).

X-Ray Diffraction (XRD) Analysis of the Nanoporous Framework Materials

Figure 3:
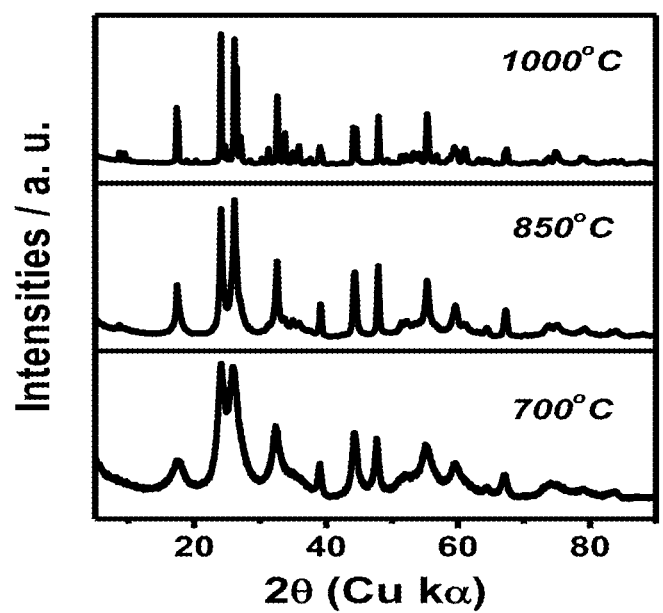
FIG. 3: XRD patterns of $TiNb_2O_7$ samples synthesized at 700° C., 850° C. and 1000° C.
Figure 4:
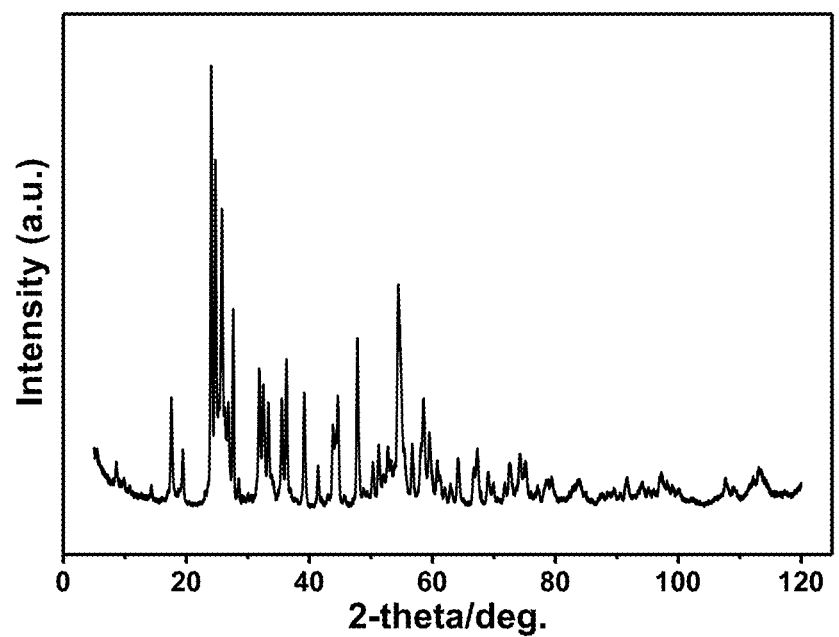
FIG. 4. X-ray diffraction (XRD) pattern of the $TiNb_2O_7$-Solid-State-1000 sample.

The XRD patterns of the as-prepared TiNb$_2$O$_7$ samples at various temperatures are shown in FIG. 3. All peaks for TNO-700 and TNO-850 reveal a broad feature, indicative of a nanosized primary particle, as is also observed from SEM and TEM results (FIGS. 1A-1E). The patterns yield the best matching to a monoclinic crystallographic system with all of the diffraction peaks in good agreement with the standard x-ray diffraction pattern JCPDS No. 77-1374. No separate phases of TiO$_2$ and Nb$_2$O$_5$ were found, suggesting that a phase-pure TiNb$_2$O$_7$ can be obtained at 700° C. for around 3 hours, which can greatly reduce production cost as compared to the conventional solid-state approach required above 1000° C. and around 24 hours (FIG. 4). As shown in FIG. 4, some impurity phases can still be observed even after treated at 1000° C. for 3 h for the sample synthesized by a solid-state approach.

Electrochemical Characterization of the Nanoporous Framework Materials

Coin cells (2032) with Li foil as counter electrode were used to evaluate the electrochemical performance of the as-synthesized materials. The working electrode was prepared by mixing the as-synthesized materials, carbon black, and poly(vinylidenedifluoride) (i.e., PVDF), at a weight ratio of 75:15:10. The slurry was casted onto Cu foil and dried under an infrared lamp to remove the solvent, followed by drying in a vacuum oven at 110° C. for 12 hours. The loading of active materials was around 1.5 mg cm$^{-2}$. For the TNO—LiNi$_{0.5}$Mn$_{1.5}$O$_4$ full-cell, the anode is limited and the weight ratio of the cathode and the anode is 3.8:1. The capacity of the full-cell was calculated based on the mass of the TNO electrode. Celgard® 2320 was used as a separator, and lithium foil was used as both counter and reference electrode. The electrolyte consisted of a solution of 1 M LiPF$_6$ in ethylene carbonate (EC)/dimethyl carbonate (DMC)/diethyl carbonate (DEC) at 1:1:1 by volume. The cells were assembled in an argon-filled glove box with moisture and oxygen levels below 0.5 ppm. Galvanostatic discharge-charge experiments were tested in the voltage range of 1.0-3.0 V on an Arbin® battery test system.

Figures 5A, 5B:
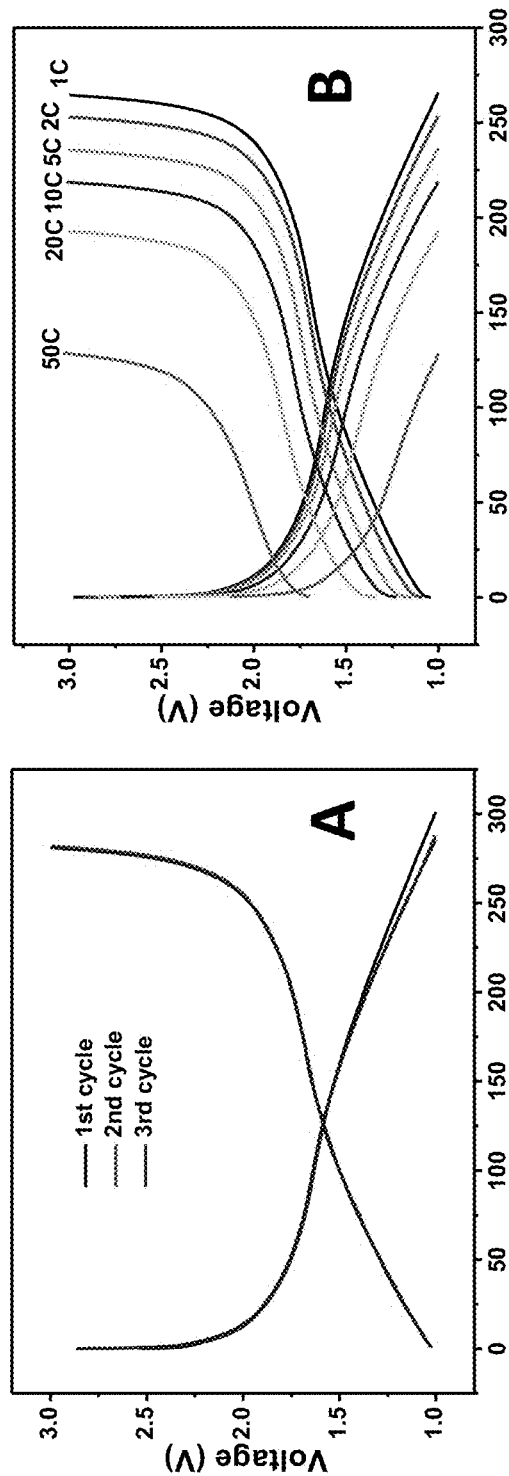
FIGS. 5A-5E. Li storage performance of nanoporous $TiNb_2O_7$.
Figure 6:
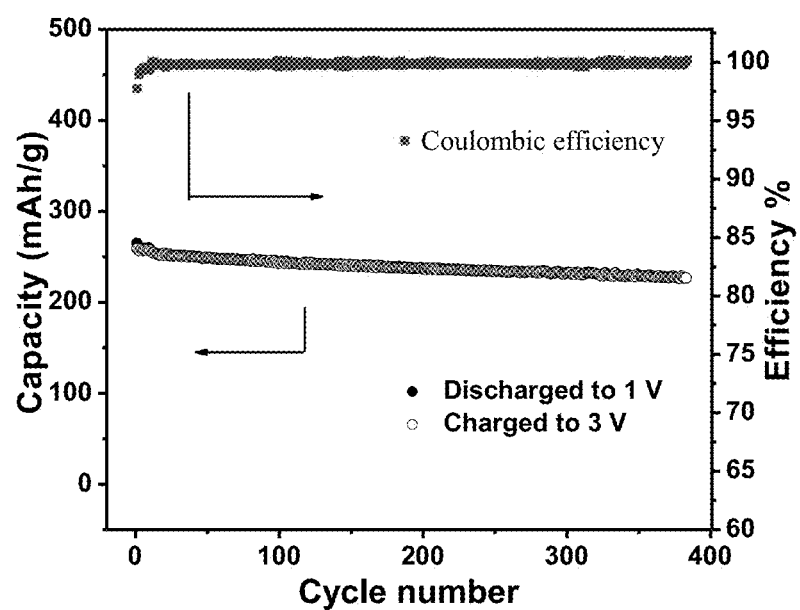
FIG. 6. Cyclic performance of the nanoporous TNO-700 sample at a current rate of 1 C (387 mA $g^{-1}$).

All cells were cycled between 1.0 V and 3.0 V. FIG. 5A shows the galvanostatic discharge (Li insertion)/charge (Li extraction) profiles for the TNO-700 anode at a low current rate of 0.1 C (38.7 mA g$^{-1}$). The reversible capacity of TNO-700 is 281 mAh g$^{-1}$, which is almost two times higher than that of LTO (~160 mAh g$^{-1}$) and also comparable to that of commercial graphite (300-330 mAh g$^{-1}$). Besides capacity and safety, another key parameter for commercial application of the anode material is coulombic efficiency, as the lithium supplied by the lithiated cathode materials is limited in the full cell. As shown in FIG. 6, the initial coulombic efficiency of the TNO-700 electrode is as high as 97% at 1 C, much higher than previously reported results about TiNb$_2$O$_7$-base materials (80-85%) and even higher than that of commercial graphite electrode (around 90%). After a few cycles at 1 C, the coulombic efficiency quickly increases to 100% and maintains even after 380 cycles. As a comparison, the coulombic efficiency of previously reported TiNb$_2$O$_7$ is only around 97%, which will lose 95% of its capacity after 100 cycles (0.97$^{100}$=0.047) in the full cell.

FIG. 5B shows the rate performance of the nanoporous TNO-700. It can be seen that the specific capacities of the TNO-700 are as high as 236 mAh g$^{-1}$ at 5 C (1.94 A g$^{-1}$), 219 mAh g$^{-1}$ at 10 C (3.87 A g$^{-1}$), and 195 mAh g$^{-1}$ at 20 C (7.74 A g$^{-1}$). Even at a high rate of 50 C (19.4 A g$^{-1}$), the specific capacity is as high as 128 mAh g$^{-1}$, which is comparable to the capacity of LTO (130 mAh g$^{-1}$) at a much lower rate of 10 C. The rate performance of nanoporous TNO-700 is much better than that of bulk, carbon coated, doped, other nanostructured TiNb$_2$O$_7$ samples and commercial graphite materials. TNO has an asymmetric charge/discharge process with the discharge process (Li insertion) being the rate-limiting step, as shown in Table 1, below. The lower D$_{Li}$ value in the lithiation process as compared to the delithiation process is consistent with the rate test result showing that the discharge process (Li-insertion) is the rate-limiting step.

TABLE 1

The chemical diffusion coefficient of lithium (D$_{Li}$) in TNO-700 and TNO-850 samples based on the cyclic voltammetry experiments.

| D$_{Li}$ | TNO-700 | TNO-850 |
| --- | --- | --- |
| Lithiation (cm$^2$/s) | 2.0 × 10$^{-12}$ | 1.8 × 10$^{-12}$ |
| Delithiation (cm$^2$/s) | 3.0 × 10$^{-12}$ | 2.7 × 10$^{-12}$ |

Figures 5C, 5D:
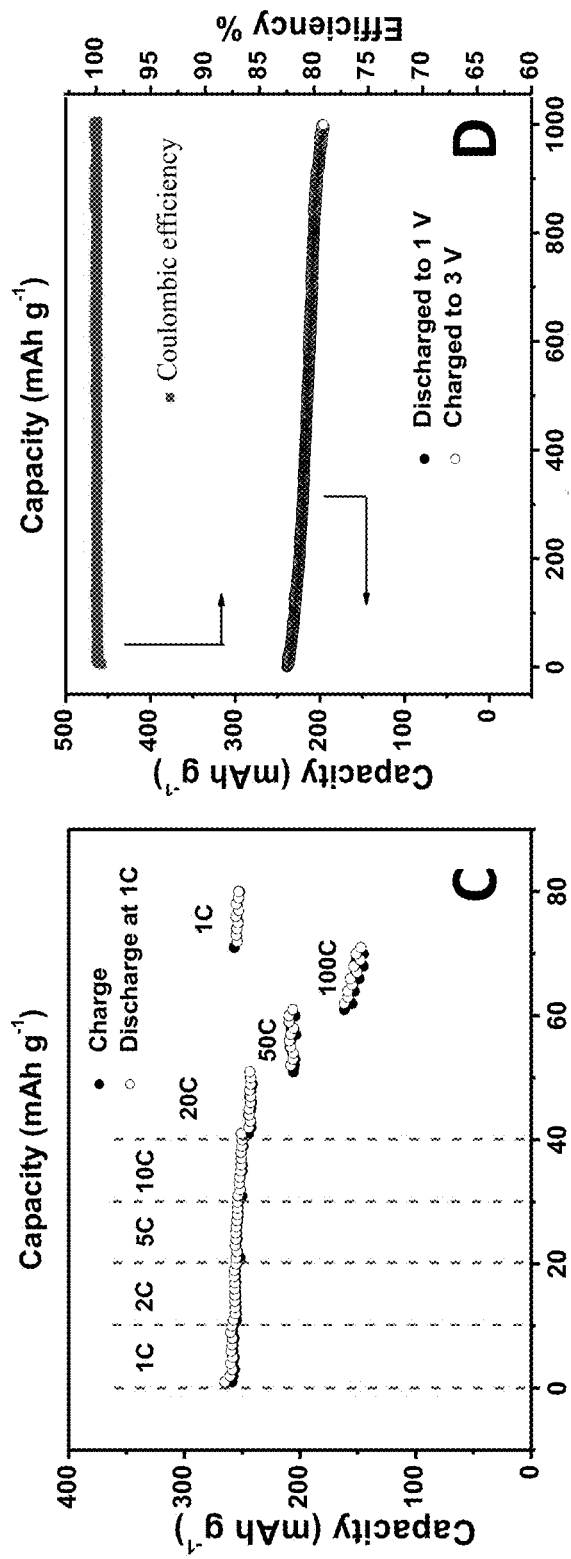

For practical applications (in full-cell configuration), high current delivery on demand (high power), which is the charge process (Li extraction) for anode materials in a half-cell, is very important. As a demonstration for such capability, FIG. 5C displays the charge rate performance of the nanoporous TNO-700 with the discharge rate fixed at 1 C. As shown in FIG. 5C, an extremely high charging rate can be achieved with the nanoporous TNO-700. For example, there is even no capacity loss observed from 1 C to 20 C; 206 mAh g$^{-1}$ can be achieved at 50 C (19.4 A g$^{-1}$, 72 s full charge), two times higher than previously reported. Even at a charging rate of 100 C (38.7 A g$^{-1}$, 36 s full charge), 160 mAh $g^{-1}$ can still be obtained, which is close to the theoretical capacity of an LTO anode (170 mAh $g^{-1}$). The latter characteristic can be considered significantly improved over the rate performance of titanium-based oxides of the art. Besides excellent rate capability, the nanoporous TNO-700 also has superior capacity retention at high rates. FIG. 5D presents data showing that the capacity of the nanoporous TNO-700 is stabilized at about 200 mAh $g^{-1}$ even after 1000 cycles at 5 C with a capacity retention of 84%; and more impressively, the coulombic efficiency is always stabilized at 100% after the first few cycles.

Figure 7A:
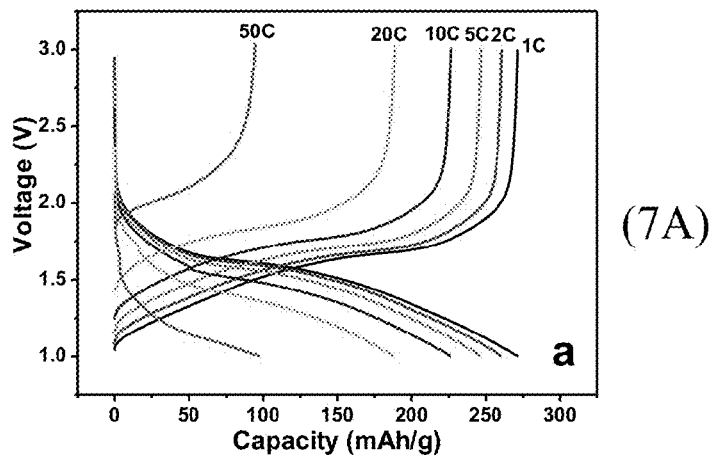
FIGS. 7A-7C.
Figure 7B:
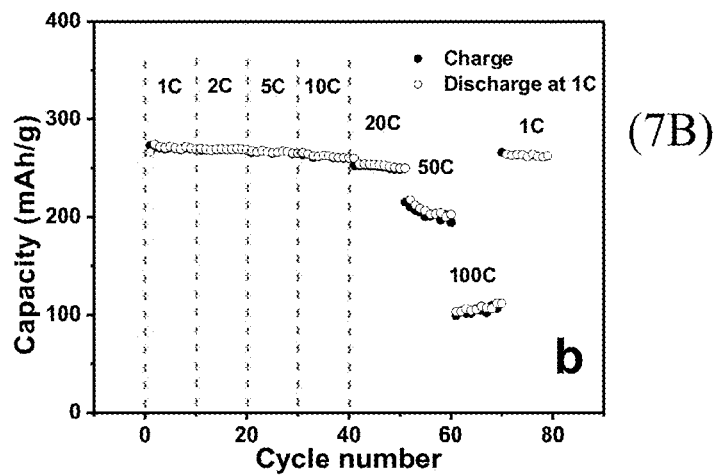
Figure 7C:
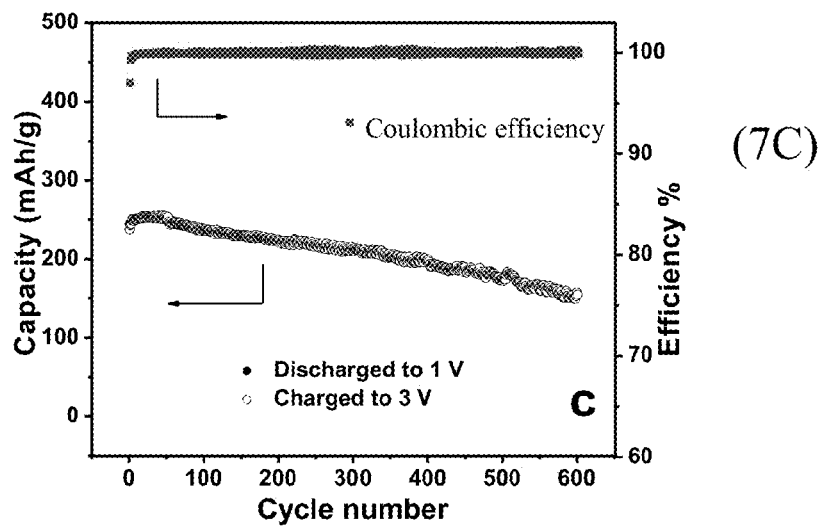
Figure 8A:
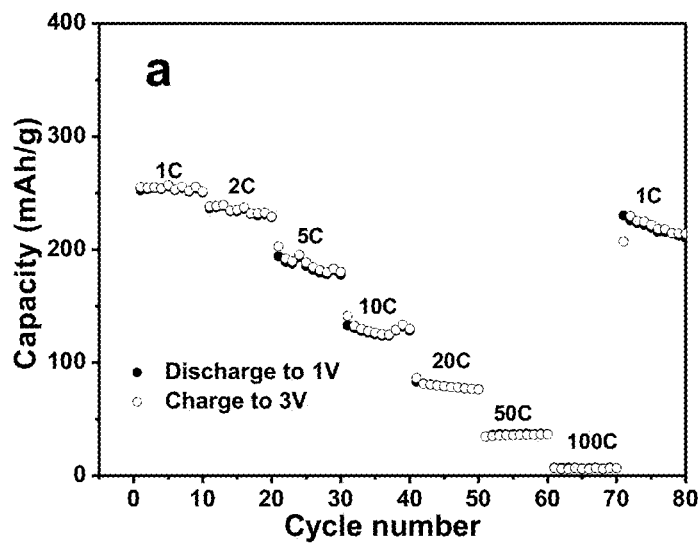
FIGS. 8A, 8B.
Figure 8B:
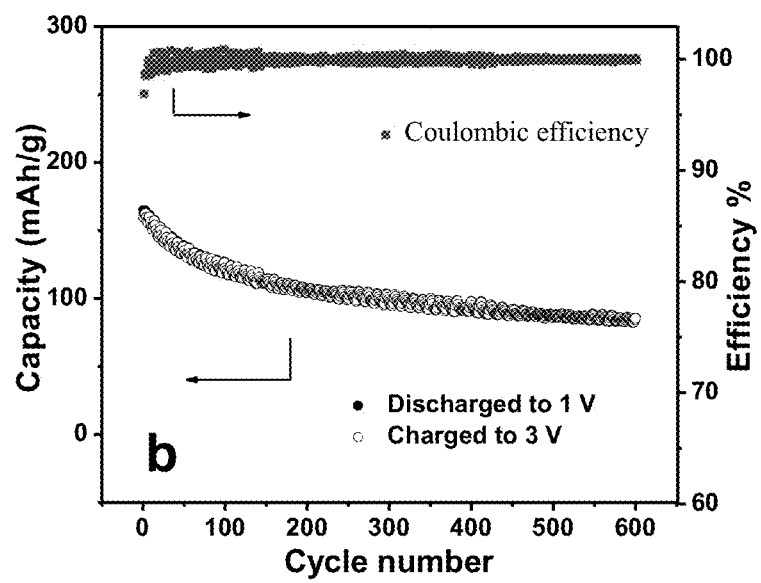

The Li-storage properties of $TiNb_2O_7$ samples prepared at 850° C. (TNO-850) and at 1000° C. (TNO-1000) were also evaluated under identical conditions. As shown by FIGS. 7A-7C, the TNO-850 shows similar Li storage behavior as TNO-700, such as high capacity as shown in FIG. 7A (286 mAh $g^{-1}$ at 0. C), excellent rate performance as shown in FIG. 7B, and high coulombic efficiency as shown in FIG. 7C. However, the TNO-850 suffers from capacity fading with cycling, with a capacity loss of 40% after 600 cycles at 5 C. In contrast to TNO-700 and TNO-850, the non-porous TNO-1000 shows much poorer electrochemical properties (FIGS. 8A, 8B). As shown in FIG. 8A, the capacity of TNO-1000 is about 250 mAh $g^{-1}$ at a low rate of 1 C, close to that of porous materials and previously reported results. However, a large capacity loss is observed when the current rate is increased from 1 C to 50 C. For example, 120 mAh $g^{-1}$ and 40 mAh $g^{-1}$ are obtained at 1 C and 50 C, respectively, only half that of the nanoporous TNO-700 at the same rates (219 mAh $g^{-1}$ at 10 C, 128 mAh $g^{-1}$ at 50 C). Furthermore, as shown in FIG. 8B, the TNO-1000 also suffers from serious capacity fading with a capacity loss of 50% after 600 cycles at 5 C.

Clearly, the high rate capability, excellent cyclic stability, and high coulombic efficiency observed for the nanoporous TNO-700 can be attributed to the interconnected nanoporous framework composed of nanocrystals having a variety of favorable properties as mentioned above. First, the interconnected channels permit facile diffusion of the liquid electrolyte into the bulk of the electrode material and greatly reduce the solid-state diffusion length for Li. Second, the high value ($\sim 10^{-12}$ $cm^2/s$, Table 1) of the $Li^+$ diffusion coefficient in TNO-700, which is similar to Li diffusion in $LiCoO_2$ and $LiMn_2O_4$, significantly improves the intrinsic kinetic property and enables the superior rate capability. Third, nanoporous TNO provides a continuous electronic conduction path along well-connected nanocrystals (a small amount of Li insertion into TNO will significantly increase the electronic conductivity of TNO.). Finally, these interconnected channels can alleviate lattice stress/strain generated from the volume expansion and contraction associated with lithium insertion and extraction, thus improving the cycling stability and coulombic efficiency of electrodes. The above favorable properties clearly show that, particularly for nanoporous TNO-700, the nanoporous metal oxide framework materials described herein provide significant advantages over known anodic materials for lithium ion batteries.

Figure 5E:
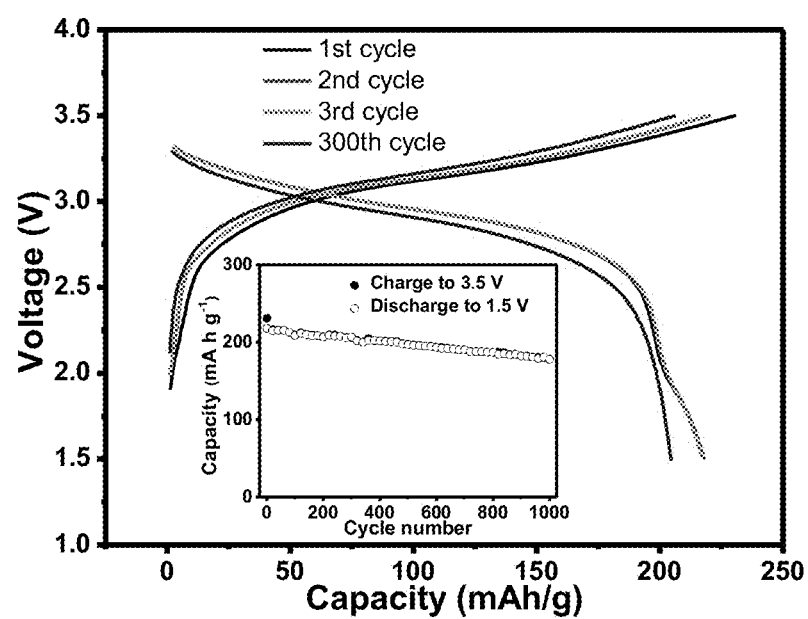

The TNO anode can combine with the $LiNi_{0.5}Mn_{1.5}O_4$ (LNMO) cathode to assemble a 3-V full cell. Based on a stable capacity delivery of 280 mAh $g^{-1}$ and 120 mAh $g^{-1}$ for TNO anode and LNMO cathode respectively, a maximum energy density of 250 Wh $kg^{-1}$ (based on the total weight of anode and cathode materials) can be obtained for the 3 V system. By virtue of the high packing density of the electrodes, the resulting TNO-LNMO full cell is also expected to have a high volumetric energy density. FIG. 5E along with inset shows typical discharge/charge curves for the TNO-LNMO full cell at 1 C with capacity limited by the TNO anode. As expected from their respective voltages, the full cell gives rise to an operating voltage around 3.0 V. The reversible capacity of the 3-V full cell at 1 C is 220 mAh $g^{-1}$. Furthermore, the full cell displays excellent cycle stability, with a capacity retention of 82% even after 1000 cycles. The TNO-LNMO battery exhibits characteristics that are highly improved compared to conventional lithium ion batteries for operation in large-scale stationary energy storage.

Figures 9A, 9B, 9C:
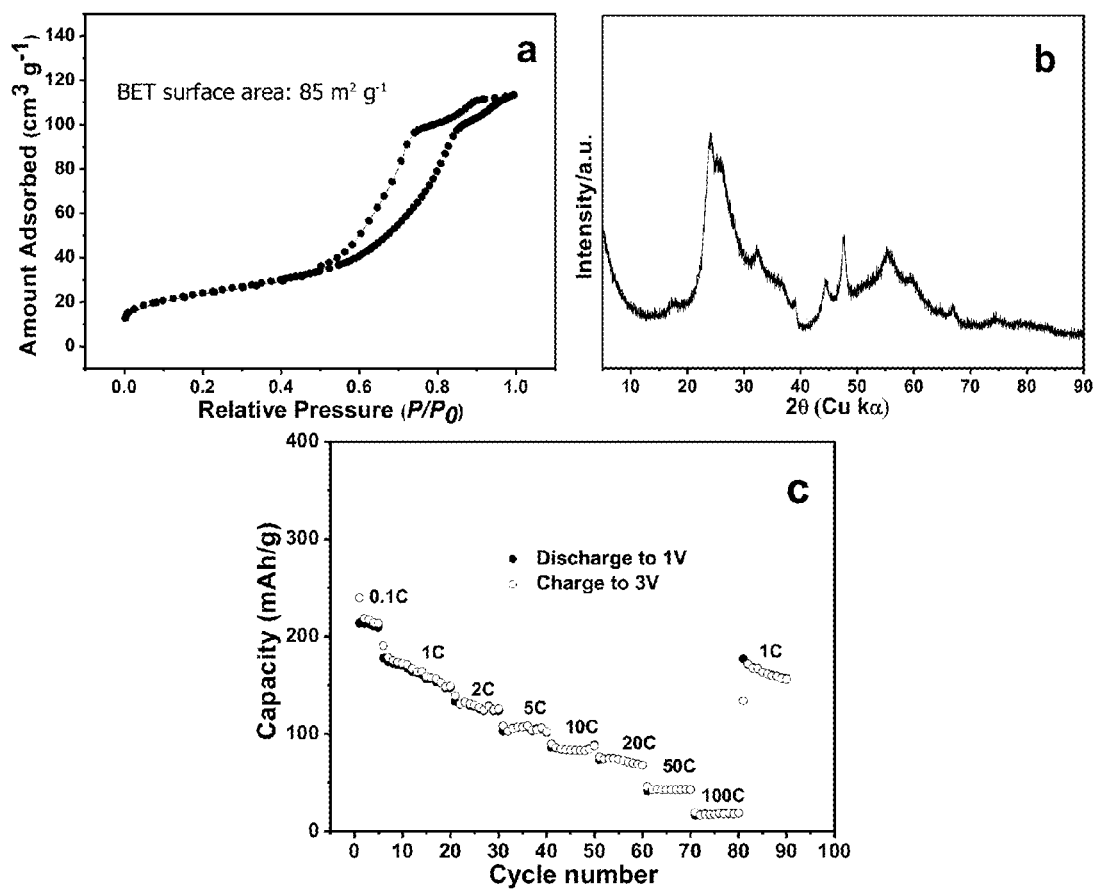
FIGS. 9A-9C.

The characteristics and performance of the TNO-600 sample were also investigated. As shown in FIG. 9A, the TNO-600 sample displays a high BET surface area of 85 $m^2$ $g^{-1}$. TNO-600 also possesses low crystallinity, as shown in the XRD in FIG. 9B. As shown in FIG. 9C, although TNO-600 possesses a high BET surface area, TNO-600 exhibits poor electrochemical properties, probably due to its low crystallinity.

Figures 10A, 10B:
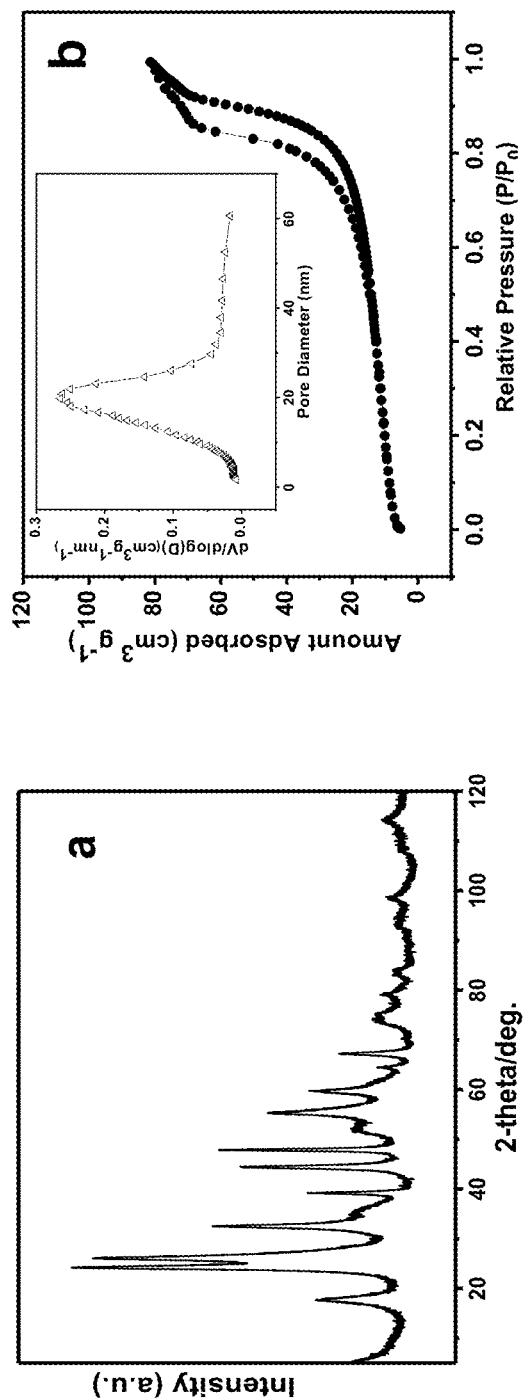
FIGS. 10A-10D.
Figures 10C, 10D:
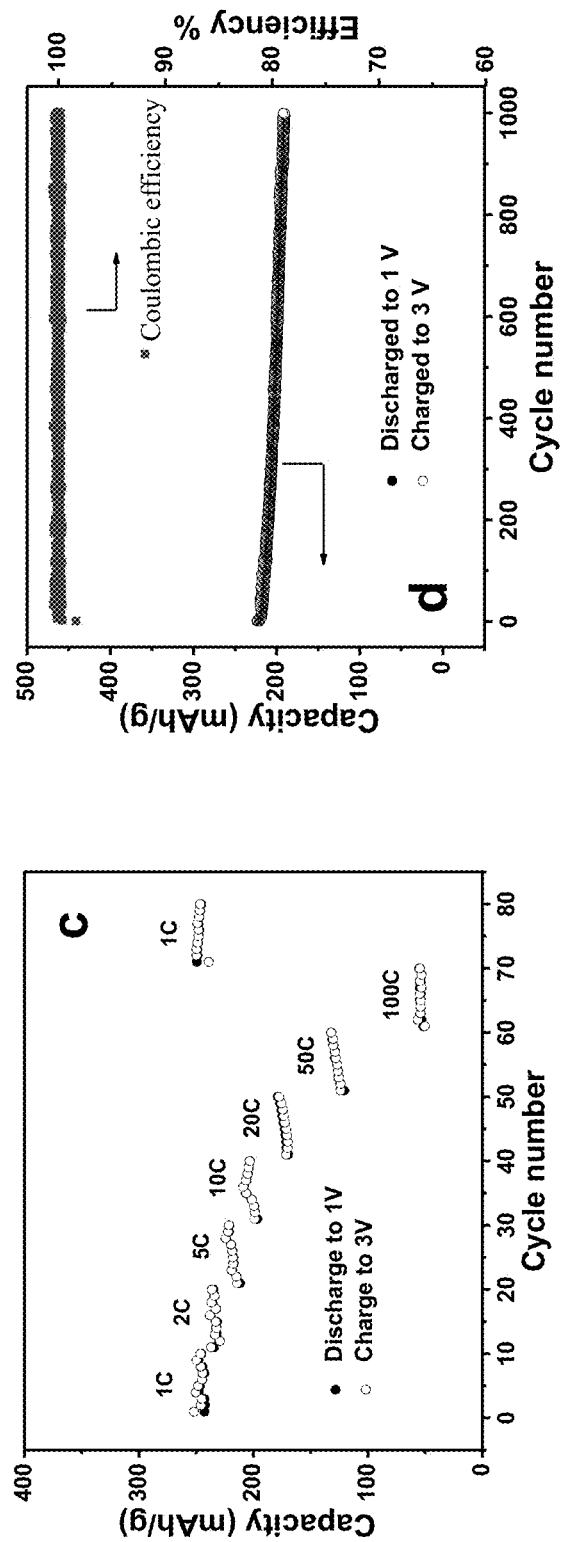

In applying the described battery technology to large scale industry, one should consider whether the expensive Nb element could hinder its application. However, the abundance of Nb in the earth is actually the same as that of lithium (20 ppm). One of the reasons for the high cost of Nb is its difficult separation from the element tantalum (Ta) because of their very similar physical and chemical properties (wherein the abundance of Ta is 2 ppm). Thus, use of a Nb—Ta precursor to directly prepare Ti—Nb—Ta—O oxides could significantly reduce the cost. For this purpose, a Ti—Nb—Ta—O oxide composition with 10% Ta replacing Nb ($TiNb_{1.8}Ta_{0.2}O_7$, also herein referred to as "TNTO") was prepared by the same approach as for TNO-700, and the composition was evaluated under similar conditions. All recorded peaks of TNTO prepared at 700° C. (TNTO-700) in the XRD pattern (FIG. 10A) can be assigned to those of $TiNb_2O_7$ with no impurity phase observed. As shown in FIG. 10B, TNTO-700 also shows a nanoporous feature with a BET surface area of 38 $m^2$ $g^{-1}$. As an anode material, as shown in FIGS. 10C and 10D, TNTO-700 also displays a high storage capacity (245 mAh/g at 1 C), excellent rate performance, and high coulombic efficiency as observed for $TiNb_2O_7$, with even a better cycling stability, with a capacity retention of 88% after 1000 cycles at a current rate of 5 C. These results surprisingly indicate that a 10% replacement of Nb with Ta may not only significantly reduce the cost of raw materials, but also remarkably improve the stability of the material.

Figure 11A:
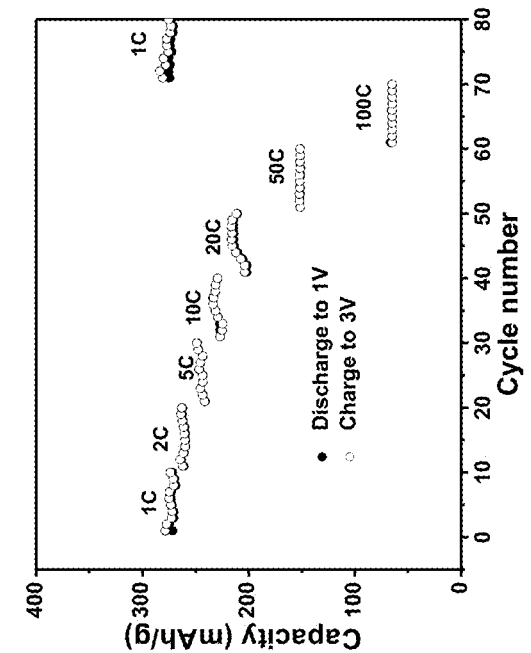
FIGS. 11A, 11B.
Figure 11B:
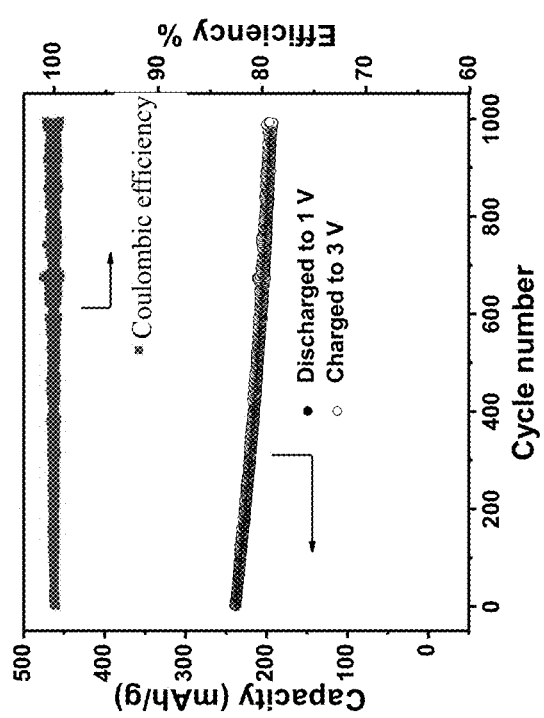
Figures 12A, 12B:
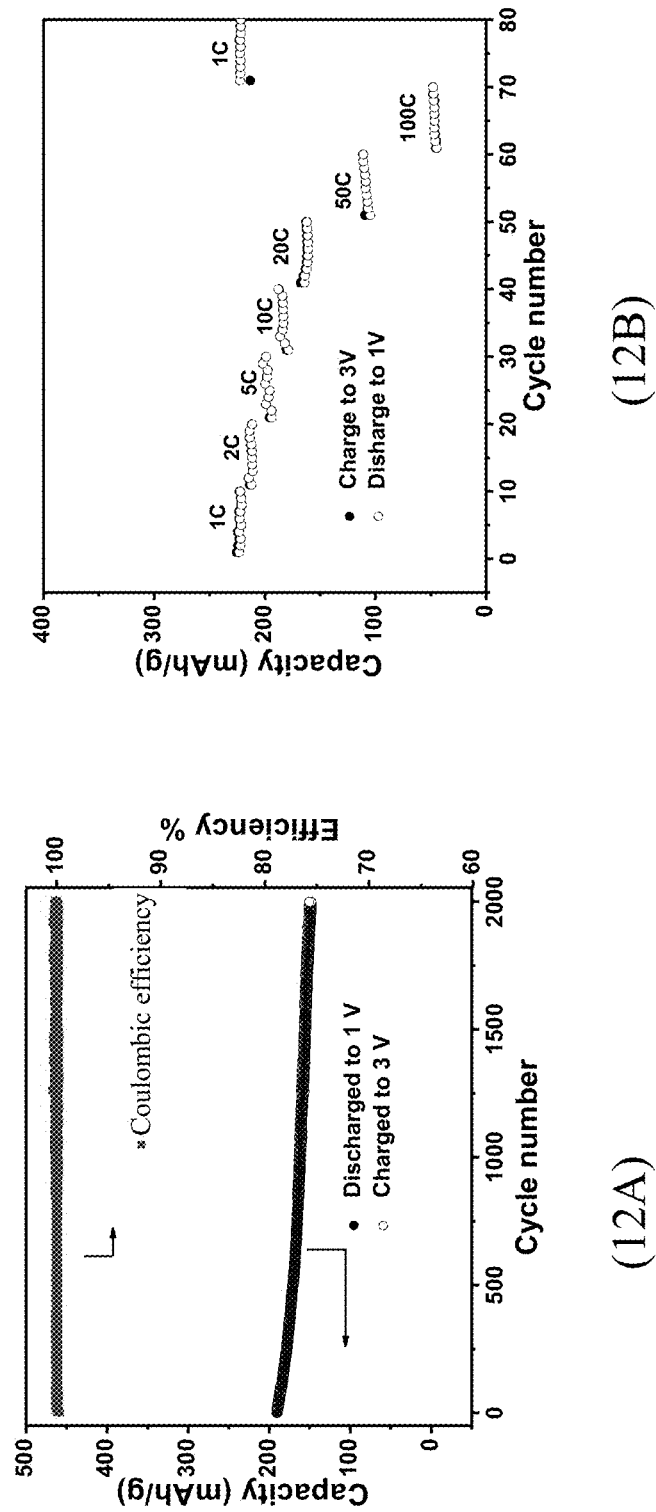
FIGS. 12A, 12B.

The electrochemical performance of the $Ti_2Nb_{10}O_{29}$ and $Ti_2Nb_{10-v}Ta_vO_{29}$ (0<v<2) samples were also investigated. FIG. 11A shows the typical cyclic performance of the nanoporous $Ti_2Nb_{10}O_{29}$ sample at a current rate of 5 C, while FIG. 11B shows the typical rate performance of the nanoporous $Ti_2Nb_{10}O_{29}$. FIG. 12A shows the typical cyclic performance of nanoporous $Ti_2Nb_{10-x}Ta_xO_{29}$ (0<x<2) samples at a current rate of 5 C, while FIG. 12B shows the typical rate performance of nanoporous $Ti_2Nb_{10-v}Ta_vO_{29}$ (0<v<2) samples. Both $Ti_2Nb_{10}O_{29}$ and $Ti_2Nb_{10-x}Ta_xO_{29}$ display high storage capacity, high coulombic efficiency, excellent rate performance, and cyclic stability, as observed for $TiNb_2O_7$.

As demonstrated in particular embodiments, $TiNb_2O_7$ with an interconnected nanoporous framework composed of nanocrystals can exhibit a reversible storage capacity of 281 mAh $g^{-1}$, with a high coulombic efficiency at an average storage voltage of 1.66 V, which is far from the lithium plating voltage, making the battery potentially safer. By virtue of the specific interconnected nanoporous structure, the $TiNb_2O_7$ anode delivers a significantly high rate performance and long cycle life as demonstrated by a capacity retention of 84% over 1000 cycles. Moreover, nanoporous TiNb$_2$O$_7$ has a high packing density, almost two times higher than that of commercial natural graphite and six times higher than that of TiO$_2$ nanopowder, which permits it to store more energy as compared to a battery of the same size containing graphite or other anode materials. To reduce the cost of raw materials, nanoporous Ti—Nb—Ta—O oxide with 10% Ta replacing Nb (TiNb$_{1.8}$Ta$_{0.2}$O$_7$) was also prepared by the same method, as discussed above, and it shows the same excellent storage properties as TiNb$_2$O$_7$. When coupled with a high voltage spinel LNMO cathode, a 3-V lithium-ion battery with excellent storage properties has been further demonstrated. The improved performance of these batteries represents a significant advance in the development of long-life stationary lithium-ion batteries for large-scale energy storage systems.

While there have been shown and described what are at present considered the preferred embodiments of the invention, those skilled in the art may make various changes and modifications which remain within the scope of the invention defined by the appended claims.

What is claimed is:

1. A composition useful as an anodic material in a lithium ion battery, the composition comprising metal oxide nanocrystals interconnected in a nanoporous framework and having interconnected channels, wherein said metal oxide has the formula TiNb$_{2-x}$Ta$_x$O$_y$, wherein x is a value of at least 0.2 and less than 2, and y is a value from 7 to 10.

2. The composition of claim 1, wherein said nanocrystals have a primary particle size of 20-100 nm.

3. The composition of claim 1, wherein said nanocrystals have a primary particle size of 20-30 nm.

4. The composition of claim 1, wherein the composition has an average pore size of 10-60 nm.

5. The composition of claim 1, wherein the composition has an average pore size of 10-20 nm.

6. A lithium ion battery comprising:
(a) an anode comprising metal oxide nanocrystals interconnected in a nanoporous framework and having interconnected channels, wherein said metal oxide has the formula TiNb$_{2-x}$Ta$_x$O$_x$, wherein x is a value of at least 0.2 and less than 2, and y is a value from 7 to 10;
(b) a cathode; and
(c) a lithium-containing electrolyte medium in contact with said anode and cathode.

7. The lithium ion battery of claim 6, wherein said nanocrystals have a primary particle size of 20-100 nm.

8. The lithium ion battery of claim 6, wherein said nanocrystals have a primary particle size of 20-30 nm.

9. The lithium ion battery of claim 6, wherein the composition has an average pore size of 10-60 nm.

10. The lithium ion battery of claim 6, wherein the composition has an average pore size of 10-20 nm.

11. The lithium ion battery of claim 6, wherein the lithium ion battery exhibits a reversible storage capacity of at least 200 mAh/g.

12. The lithium ion battery of claim 6, wherein the lithium ion battery exhibits a reversible storage capacity of at least 250 mAh/g.

13. The lithium ion battery of claim 6, wherein the lithium ion battery exhibits a coulombic efficiency of at least 99% maintained over at least 100 cycles.

14. The lithium ion battery of claim 6, wherein the lithium ion battery exhibits a coulombic efficiency of at least 99% maintained over at least 200 cycles.

15. The composition of claim 1, wherein x is a value of 0.2 to 1.9.

16. The lithium ion battery of claim 6, wherein x is a value of 0.2 to 1.9.

* * * * *